United States Patent [19]

Sidman et al.

[11] Patent Number: 4,740,736
[45] Date of Patent: Apr. 26, 1988

[54] SERVO DATA DECODER FOR ANY AMPLITUDE DEPENDENT SERVO DATA ENCODING SCHEME

[75] Inventors: Steven B. Sidman, Campbell; Steven Harris, Milpitas; Rudolph J. Sterner, Cupertino; Eugen Gershon, Los Gatos, all of Calif.

[73] Assignee: Advanced Micro Devices, Inc., Sunnyvale, Calif.

[21] Appl. No.: 884,111

[22] Filed: Jul. 10, 1986

[51] Int. Cl.[4] .............................................. G05B 1/01
[52] U.S. Cl. .................................... 318/608; 318/561; 318/636; 360/77
[58] Field of Search ............... 318/617, 636, 606, 607, 318/608, 561; 360/77

[56] References Cited

U.S. PATENT DOCUMENTS 4,135,217  1/1979  Jacques et al. ................ 318/617 X
4,379,256  4/1983  Maury ................................ 318/636
4,412,165 10/1983  Case et al. ......................... 318/636

Primary Examiner—Benjamin Dobeck
Attorney, Agent, or Firm—Patrick T. King; Ronald C. Fish; J. Vincent Tortolano

[57] ABSTRACT

There is disclosed herein a servo data decoder which can decode both quadrature and non quadrature servo data. The decoder is comprised of a servo data amplitude demodulator to generate position error signals and a position error signal processor to generate a GPES signal to serve as a position error signal during the track following mode and a velocity signal and a track crossing signal for use in the seek mode. The user system may have either single or double pulse sync, and double pulse sync spacing, pulse window time and sync to first data pulse delay are user definable. The user may adjust the gain of the system in two manners and may program the frequency response characteristics of the phase locked loop. Many other user definable or user alterable features are provided.

13 Claims, 15 Drawing Sheets

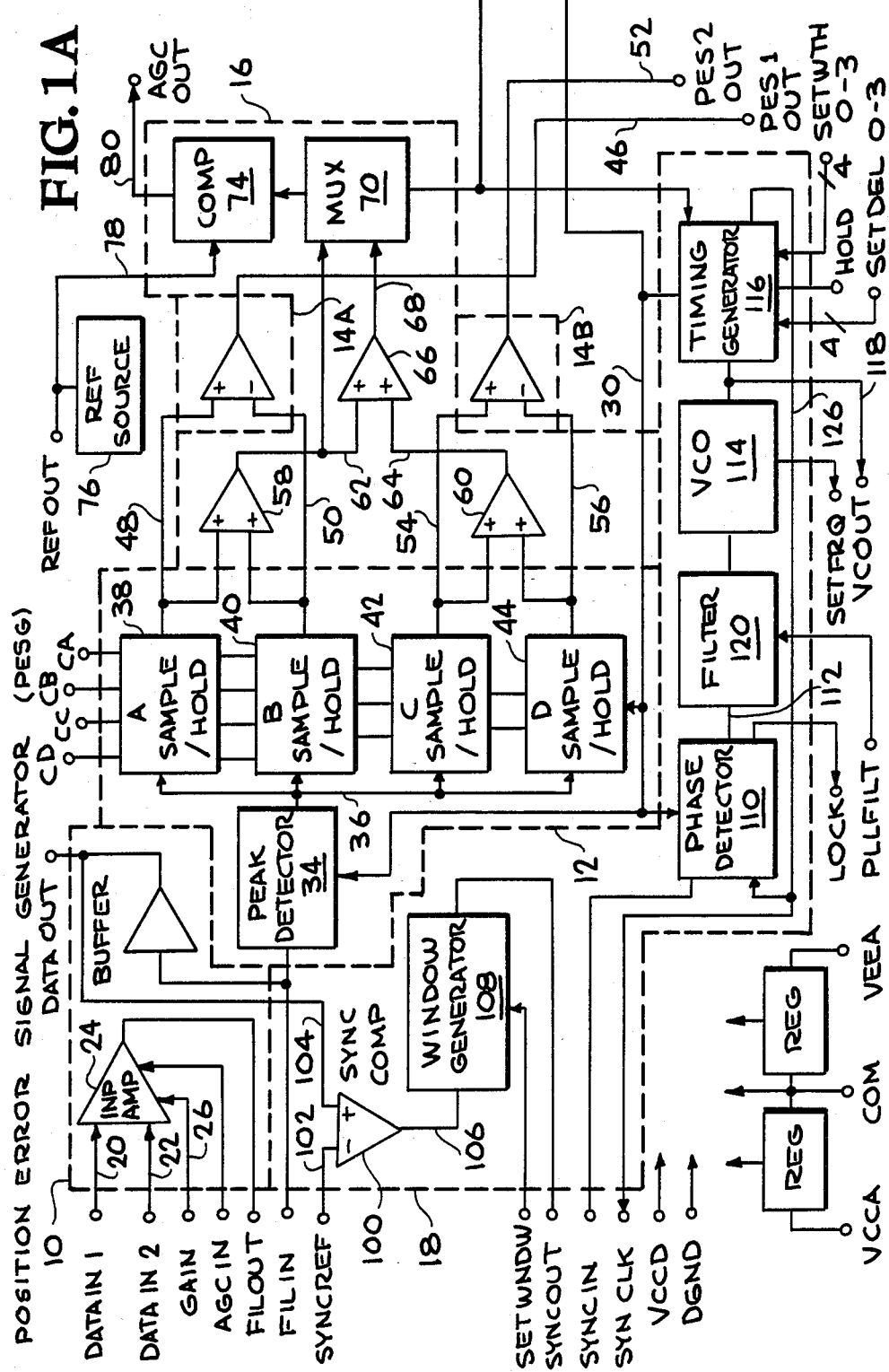

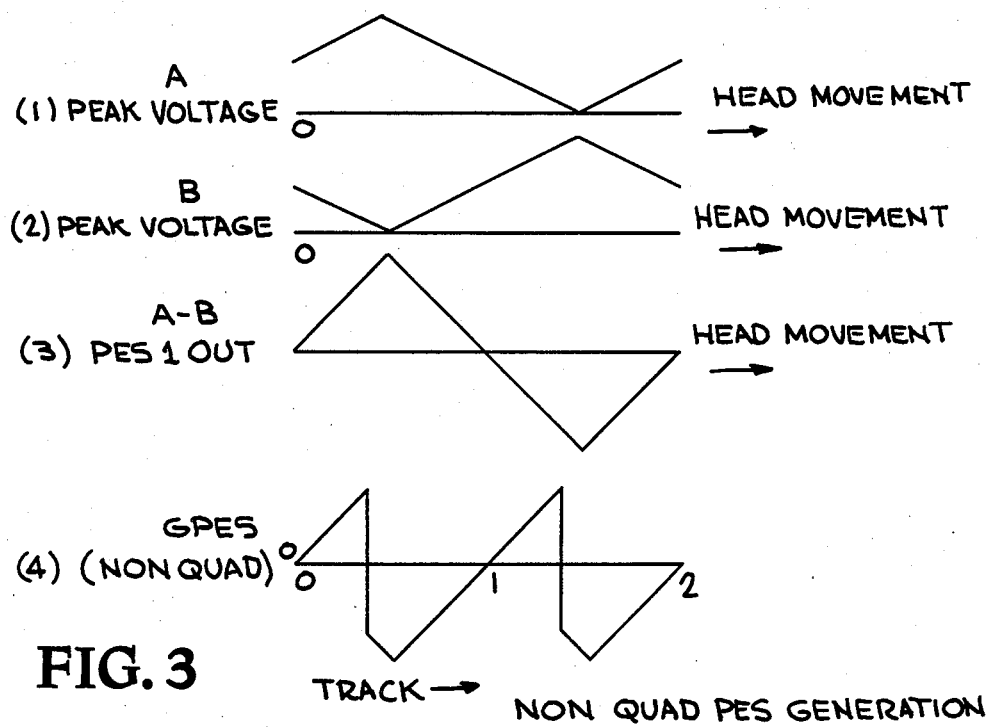
FIG. 3 NON QUAD PES GENERATION
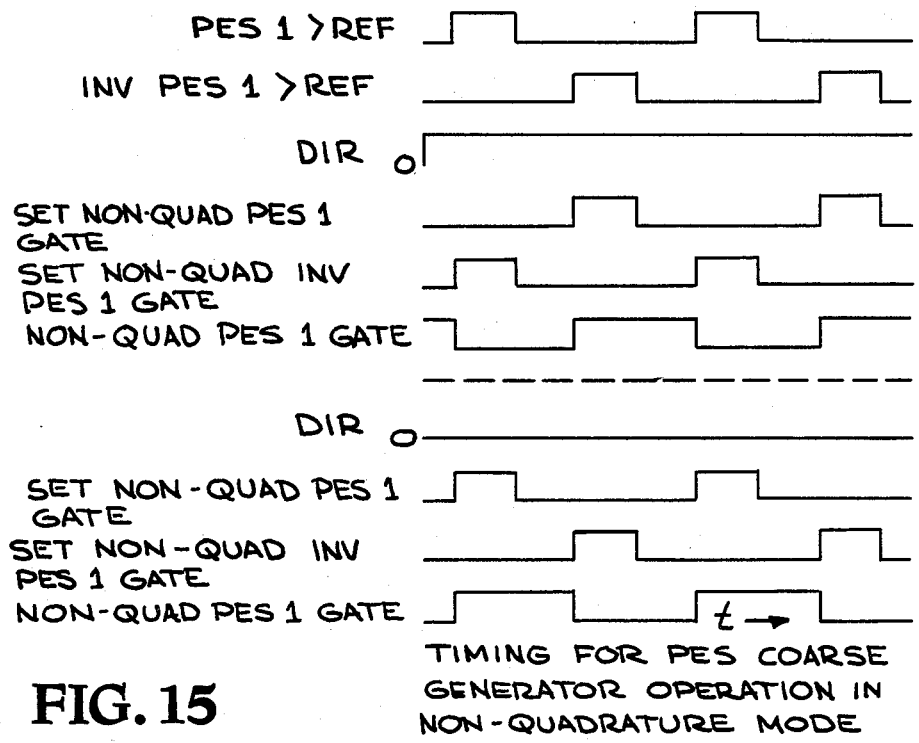
FIG. 15 TIMING FOR PES COARSE GENERATOR OPERATION IN NON-QUADRATURE MODE

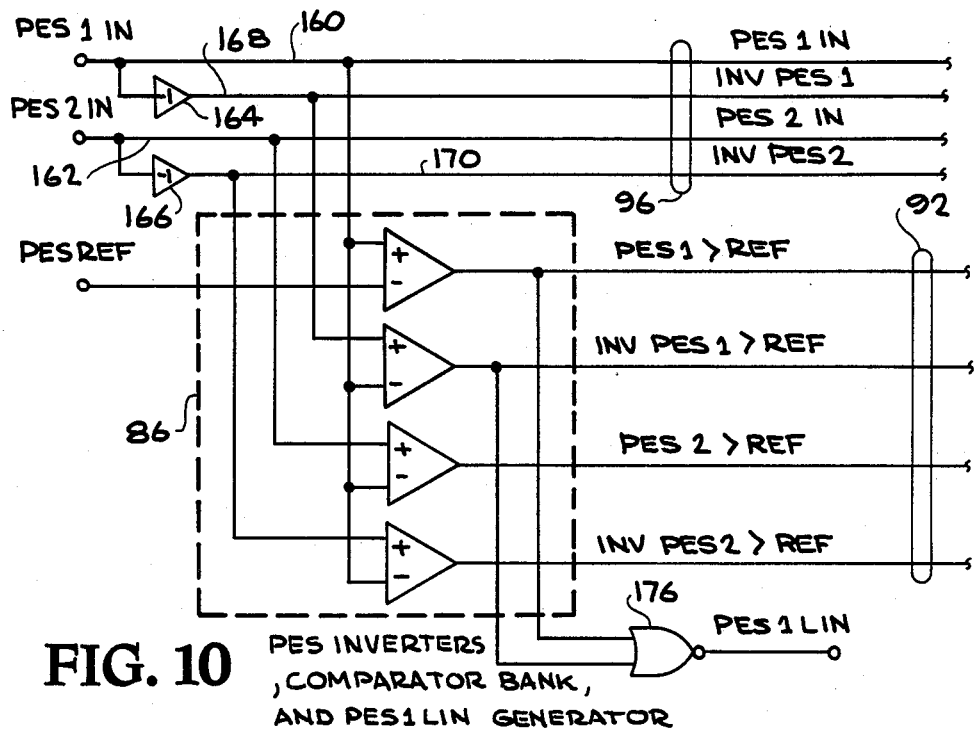
FIG. 10 PES INVERTERS, COMPARATOR BANK, AND PES 1 LIN GENERATOR
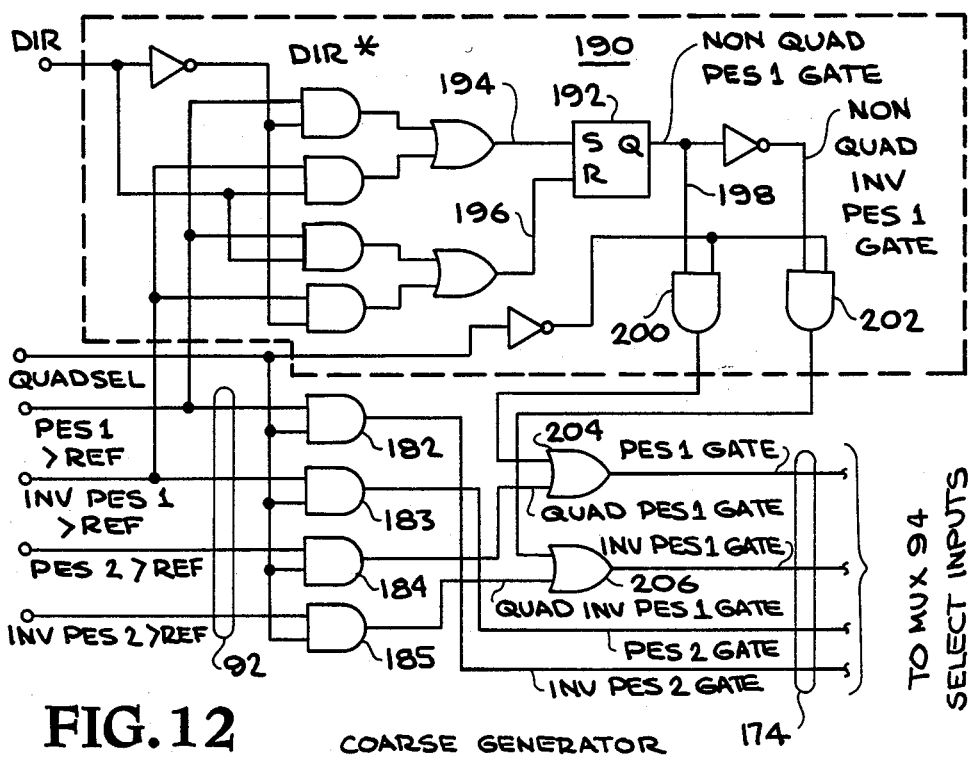
FIG. 12 COARSE GENERATOR

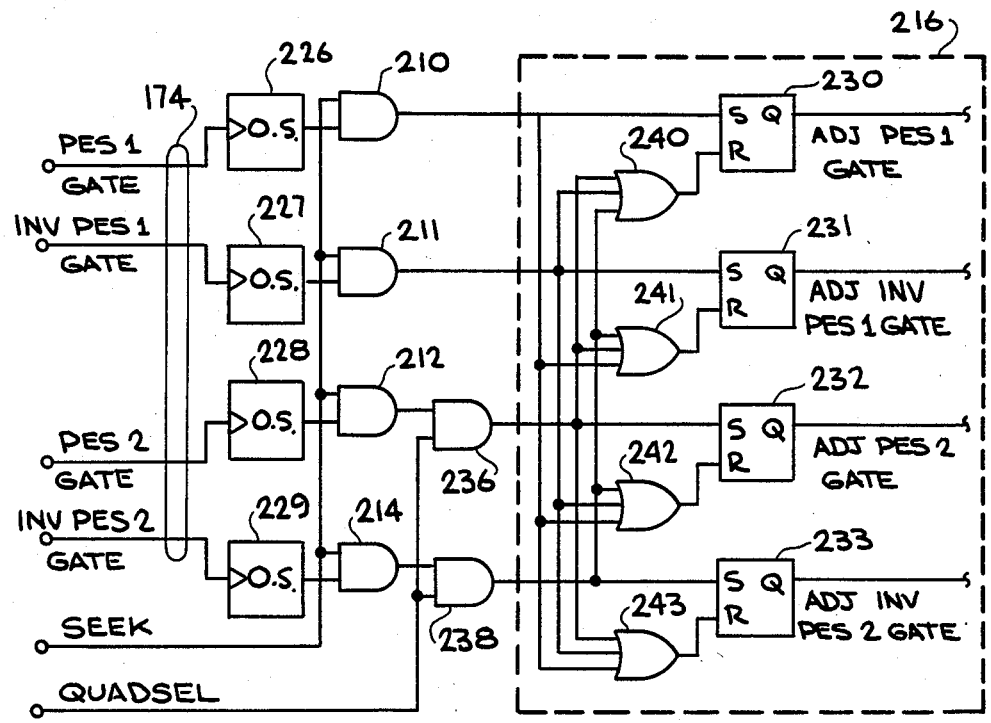
PES GATING SIGNAL ADJUSTER   FIG. 16
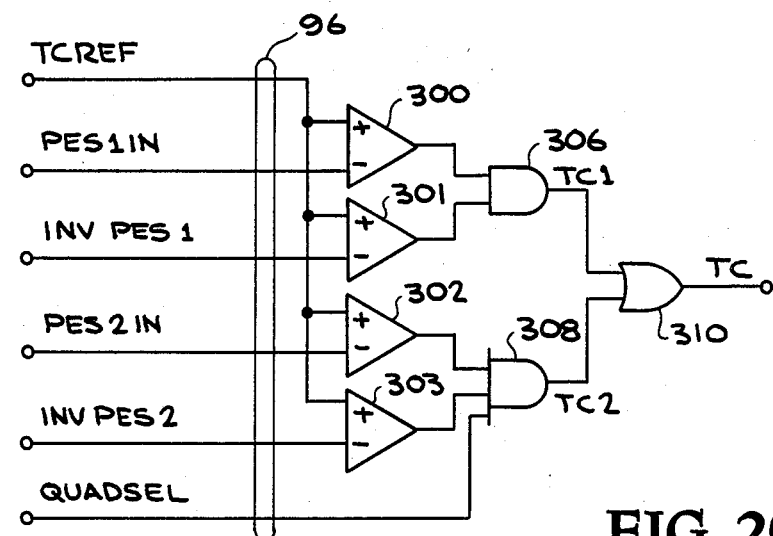
TRACK CROSSING (TC) GENERATOR   FIG. 20

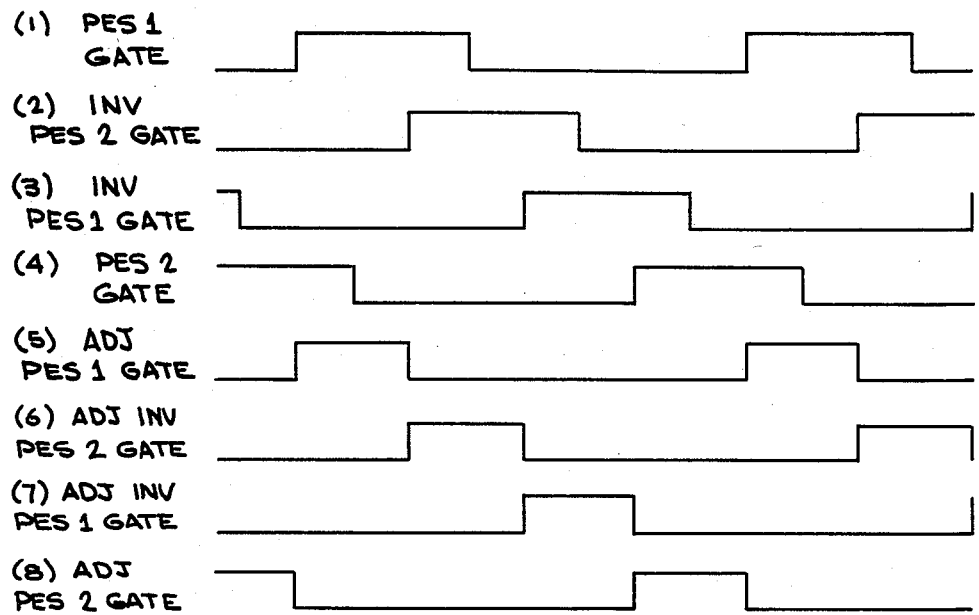
ADJUSTED GATING SIGNALS WHEN GATING SIGNALS OVERLAP
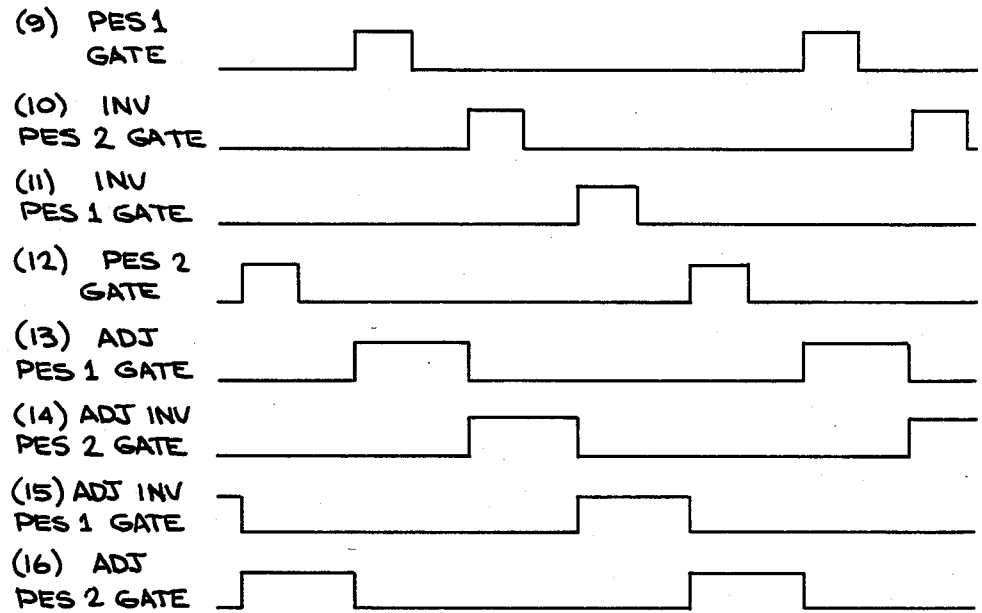
ADJUSTED GATING SIGNALS WHEN SIGNALS HAVE A GAP
FIG. 17

SERVO DATA DECODER FOR ANY AMPLITUDE DEPENDENT SERVO DATA ENCODING SCHEME

BACKGROUND OF THE INVENTION

The invention pertains to the field of disk drive control circuitry, and, more particularly, to the servo data decoders for interpreting servo data read from surfaces which are recorded with dedicated servo data for use in head positioning servo mechanisms in computer disk drives.

As with most computer peripheral markets, a plethora of standards or techniques has emerged for controlling the head position in disk drives. Typically, all such techniques involve servo data which is recorded on magnetic media in a known manner. The servo data is recorded on all tracks, and the data on adjacent tracks is different. This data can be read by magnetic heads as the disk surface spins, and pulses of various amplitudes and timing relationships result. Generally speaking, it is possible to determine the head position by determining the amplitude of these servo data pulses and examining their timing relationships.

Several servo data encoding schemes exist to utilize the above noted general scheme in head positioning. Some of these schemes utilize dedicated servo surfaces which are permanently recorded with servo data. No user data is recorded on these surfaces, but the servo data read head is mechanically ganged to the read/write head for the user's data. One servo data encoding scheme, which is the most popular, is called quadrature data encoding. In this scheme the servo data is recorded on groups of 4 adjacent tracks. Each track of each group of 4 has a servo data magnetic flux transition at a particular angular position displacement from the position of a synchronization flux transition. Each track in each group has its flux transition located at a different position from the synchronization flux transition. Each synchronization flux transition marks the beginning of a data frame. Each data frame in quadrature data is separated into 4 windows or periods. When the disk rotates, the servo head which flys over the servo data will pick up pulses from the flux transitions that are occurring on the data tracks under the servo head. The pulses picked up by the servo head will occur during their respective windows in the data frame, and their amplitudes will depend upon how far the servo head is away from the track centers of each of the 4 tracks in each group. This information can be sampled and processed so as to determine the servo head position. The data head position follows from the servo head position.

Another popular form of servo data encoding is called tri-bit servo data encoding. In this system, each frame starts out with a synchronization pulse, but there are only two windows in each frame and only two adjacent tracks are coded with related servo data for each group. Each servo data track in each group has a servo data flux transition which is located at a specific angular displacement from the flux transition from the synchronization flux transition as in quadrature data. These flux transitions result in servo data pulses which occur in the specific windows following the synchronization pulses, and their amplitudes are a measure of how far the servo data head is from the track centers of the servo data tracks. The tri-bit servo data is decoded in a similar manner to the decoding method for quadrature data in that the amplitudes of the servo data pulses that occur in the various windows are sampled, and the servo head position is calculated from this amplitude data.

A position error signal is generated from the amplitude data. This signal or signals depending upon which system is being decoded is used by the disk drive head positioning servo mechanism to position the data head over the data track center while operating in the track following mode.

When the data must be moved to the center of a new data track, the disk drive head control system enters what is known as the seek mode. In this mode, the head is moved from its current track to a new track in accordance with a velocity profile defined by the user. To support such operations, a servo data decoder must supply a velocity signal which indicates how fast the heads are moving over the data tracks. The servo data decoder must also supply a track crossing signal. This signal is used by the disk drive head control system to measure the progress of the data head toward its destination track so that the proper velocity profile may be maintained.

Some prior art servo data encoding schemes do not use dedicated servo surfaces and dedicated servo heads. In these systems, the servo data is embedded in the user's data, and the read/write head is used to read the servo data. Decoding of such servo data requires that the servo data decoder be frozen during the time that the head is over read data.

Prior art servo data decoders such as the Fairchild uA2460 and uA2470 are only capable of decoding one servo data encoding scheme. In the case of the Fairchild part, only quadrature data may be decoded. A different part must be used if tri-bit or some other encoding scheme is used. Further, the user is not provided with access to various signals in the system or subsystems therein. This prevents the user from being able to modify the parameters of the system, modify its operations, filter certain signals to eliminate noise or cause the system to operate on an average basis over several frames rather than on a frame to frame basis. Further, some disk drive systems operate at different gain levels for the servo data than others, and the user must be able to compensate for this. Also, disk drive systems vary in the time of occurrence of the first servo data pulse after the synchronization pulse and in the duration of the windows in the servo data frame during which the servo data pulses occur.

A need has therefore arisen for a servo data decoder to provide the user with the ability to adjust for these differences and which is able to decode any servo data which is encoded with an amplitude dependent data encoding scheme.

SUMMARY OF THE INVENTION

According to the teachings of the invention, there is provided a system which fills the above noted needs. A servo data decoder, built in accordance with the teachings of the invention, uses a position error signal generator (hereafter PESG) and a position error signal processor (hereafter PESP). The position error signal generator demodulates the servo data pulses into position error signals. The position error signal processor converts the position error signal to a gated position error signal, a velocity signal and a track crossing signal.

The position error signal is generated by creating timing windows in each servo data frame during which the servo data pulses are expected to occur. This is done using a phase locked loop and synchronization pulse window generator. The window generator creates a window during which the servo data synchronization pulse from the head is expected to arrive. This synchronization pulse is used to synchronize the frequency of operation of the phase locked loop to the frequency of the synchronization pulses, and, thus, to the frequency of occurrence of the servo data frames. The phase locked loop (hereafter PLL) frequency is used as a clock for purposes of decoding to divide each servo data frame up into 32 time slots. The user may input signals which define, in terms of the 32 time slots, the windows desired in the servo data frame, when the first one occurs and the duration of each window. The user may also change the frequency response characteristics of the PLL by coupling an external capacitor to a pin. This can change the operation of the PLL by altering the frequency response of the PLL filter. Further, the user may input a HOLD signal which blocks generations of the timing windows during periods in embedded servo systems when the head is over non servo data. The user may also input a signal which sets the gain range and gain in that range of the input amplifier that processes the servo data coming in from the head. The user may also have access to the amplifier output to filter out noise and to look at the servo data. A port is also provided whereby the user may set the duration of the synchronization window. The high frequency clock of the PLL is provided as an output signal to users so that they may use it as their write clock. The PLL synchronization input is also provided as a pin so that users that do not use on-disk synchronization flux transitions may synchronize the PLL to their data frames by providing an appropriate signal to the PLL.

The position error signal generator uses the windows created by the PLL to sample the amplitudes of servo data pulses coming in from the head. This is done using a peak detector and 4 sample and hold circuits. The user may input a signal indicating whether quadrature or non quadrature servo data encoding is being used. This signal controls the window generation so that 4 windows are generated for quadrature data and 2 windows are generated for tri bit servo data encoding. The sample and hold circuits sample the amplitudes, measured by the peak detector, of the servo data pulses that occur during the windows, and from these amplitudes, the position error signals are generated.

The position error signals are provided as outputs from the decoder. The inputs to the PESP are also provided. The user may filter the position error signal or signals before feeding them into the PESP. This configuration allows the decoder to operate over an average of many frames in generating the gated position error signal (hereafter GPES), the velocity signal (hereinafter VEL) and the track crossing signal (hereafter TC). If no filtering is used, these signals are updated every servo data frame.

The PESP receives type position error signal or signals and converts them to the above noted signals. The GPES signal is output for use by the user in correcting the position of the head during the track following mode. The velocity signal and the track crossing signals are output for use by the user in the seek mode in determining whether the velocity profile during seek movements is being corrected followed. The PESP also generates a PESLIN signal which indicates when the position error signal is in the linear range and acceptable for use in the track following mode. The GPES signal is generated by inverting the incoming position error signals and using a multiplexer to properly select the one of the non inverted or inverted position error signals which has the proper slope for use as the GPES signal. Only positive slopes are acceptable. The velocity and track signals are generated as will be described below.

BRIEF DESCRIPTION OF THE DRAWINGS

FIG. 3 is a diagram of typical non quadrature position error signal generation.

FIG. 10 is a logic diagram of the position error signal inverters, the comparator bank and the PES1LIN generator.

FIG. 12 is a logic diagram of the coarse generator in the PES control signal generator.

FIG. 15 is a timing diagram for the PES coarse generator operation in non quadrature mode.

FIG. 16 is a logic diagram for the PES gating signal adjuster.

FIG. 17 is a timing diagram for the operation of the PES gating signal adjuster when there is overlap between the input PES signals and when there is a gap between the input PES signals.

FIG. 20 is a logic diagram for the track crossing generator.

DETAILED DESCRIPTION OF THE PREFERRED EMBODIMENT

Figure 1B:
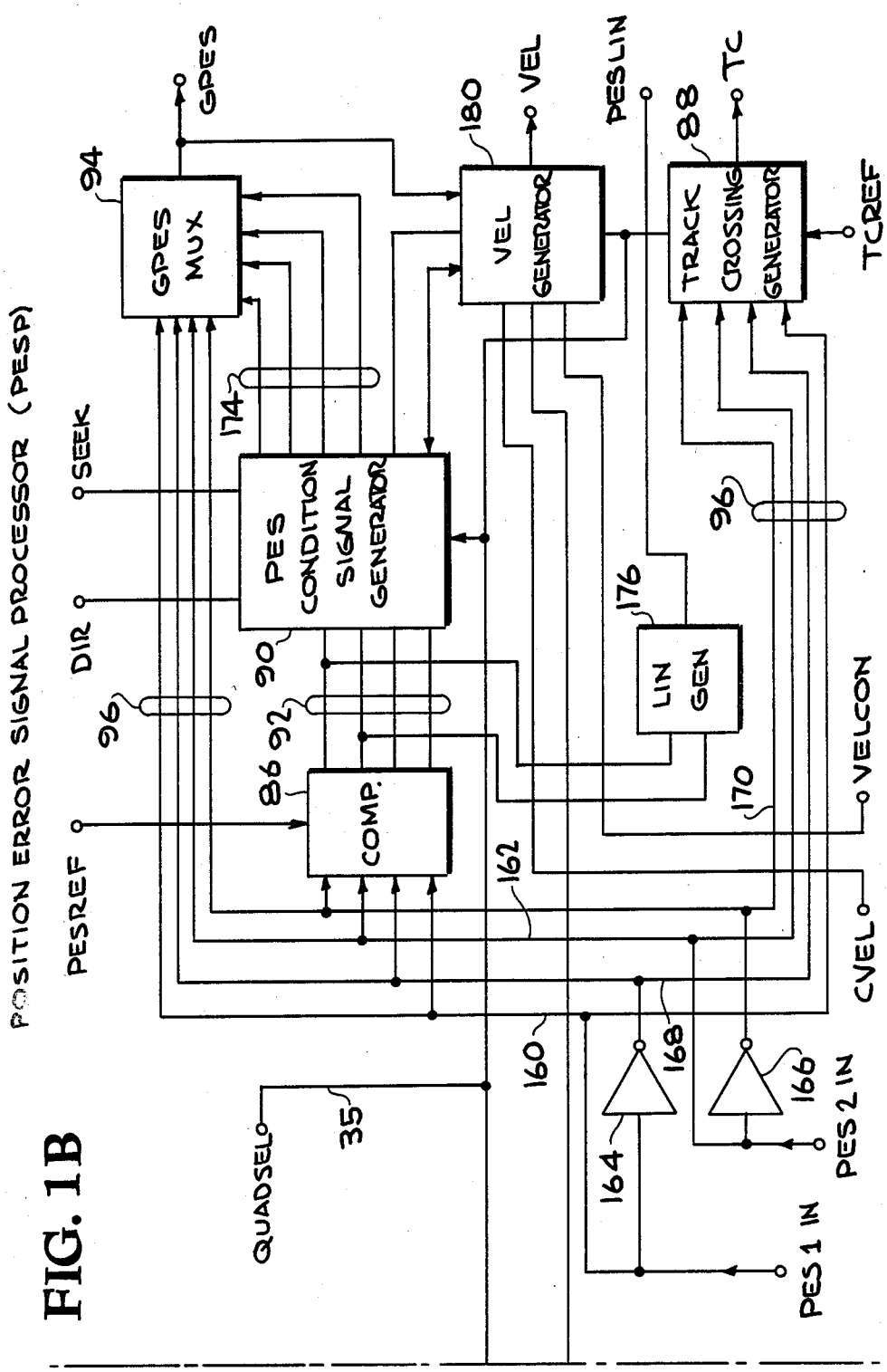
FIG. 1 is a block diagram of the system of the invention.

FIG. 1 is a block diagram of the system in accordance with the teachings of the invention. The PESG portion of the system is that circuitry to the left of the dashed vertical line, and the PESP is the circuitry to the right of the vertical dashed line. The PESG is comprised of: an input amplifier 10; an amplitude demodulator 12; an output amplifier 14A and 14B; an AGC circuit 16; and, a timing control circuit 18.

The Input Amplifier

The servo data from the head enters the decoder on the DATAIN1 and DATAIN2 signal lines 20 and 22 respectively. Since the servo data signals from the head preamplifier are small in amplitude, it is necessary to amplify them to a usable level. Preamplifier 24 accomplishes this function by amplifying the input signals to about 2.5 volts peak to peak. The input amplifier 24 also provides means by which the user may set the gain of the amplifier in two ways. The first way is through the GAIN input signal on line 26. Typically, the user connects a resistor to this pin (the preferred embodiment of the invention is as an integrated circuit) to adjust the gain within a 40 db range. This provides the user with the ability to adjust for the coarse difference between different types of drives. A fine tuning of the gain of the system is provided by the AGC system 16. The AGC system copes with variations in the servo data signal amplitudes as the disk rotates and as the head moves from the inside to the outside track. The AGC range is about 20 db. Before the operation of the AGC can be understood, it is first necessary to understand the operation of the amplitude demodulator 12. The amplitude demodulator operation will be explained in more detail below.

The input amplifier is typically a 30 Mhz bandwidth amplifier with a typical voltage gain of 60 db plus or minus 10 db. Typically, the input amplifier comprises a differential amplifier input stage with a fixed gain of 5 and a single ended output. The input stage should have a very good noise performance since its equivalent input noise will be the dominant noise in the system. That is, the signal to noise ratio at the input is defined by the performance of the amplifier 24. A figure of 8 nanovolts per square root of Hertz would be acceptable and 1 nanovolt per square root of Hertz would be ideal. A signal to noise ratio of 200 for a 100 ohm source impedance and a bandwidth of 25 Mhz and a head signal of 1 millivolt would be acceptable. These parameters are not critical to the invention however, and many other parameters for the amplifier 24 would also suffice to practice the invention. Indeed, the invention can be practiced without providing two methods of gain control. A simple preamplifier having adequate bandwidth, gain and noise characteristics would suffice. The invention could be practiced with only an AGC gain stage. Further, the invention could be practiced with only a resistor controlled gain as long as an external gain control system to regulate the average servo data input amplitude to the system of the invention is used. The presence of both mechanisms in the preferred embodiment only eases manufacture of the disk drive control system for the user. The need for an external AGC system would present unnecessary complications for the user. Alternatively, only an AGC gain control mechanism might be used. Unfortunately, the AGC would probably need a range which was very large to handle all the possible user systems. Such as AGC circuit would be difficult to design.

The input stage of the amplifier is typically followed by an externally adjustable gain stage with a gain of about 40 db set by a single external resistor coupled to the GAIN input signal pin. This stage is typically followed by a voltage adjustable gain stage which has its gain signal input coupled to the AGCIN input signal pin. Typically, this stage has a gain of 20 db. The response speed of this voltage adjustable gain stage to changes in the gain control voltage should be generally in the range of 5 microseconds.

Because noise is an undesirable component in the output of the amplifier 24, the output of the amplifier, FILOUT is made available to the user so that a low pass filter may be inserted by the user before feeding the servo data back into the FILIN signal input to the amplitude demodulator 12. This allows high frequency noise in the output signal from the amplifier to be filtered out. This noise may be picked up by the wiring between the head and the inputs of the amplifier 24 or may be generated in the amplifier itself. Typically, the user will also include a high pass filter between FILOUT and FILIN to block direct current thereby eliminating any offset voltage in the input to the amplitude demodulator 12.

The Amplitude Demodulator

Figure 2:
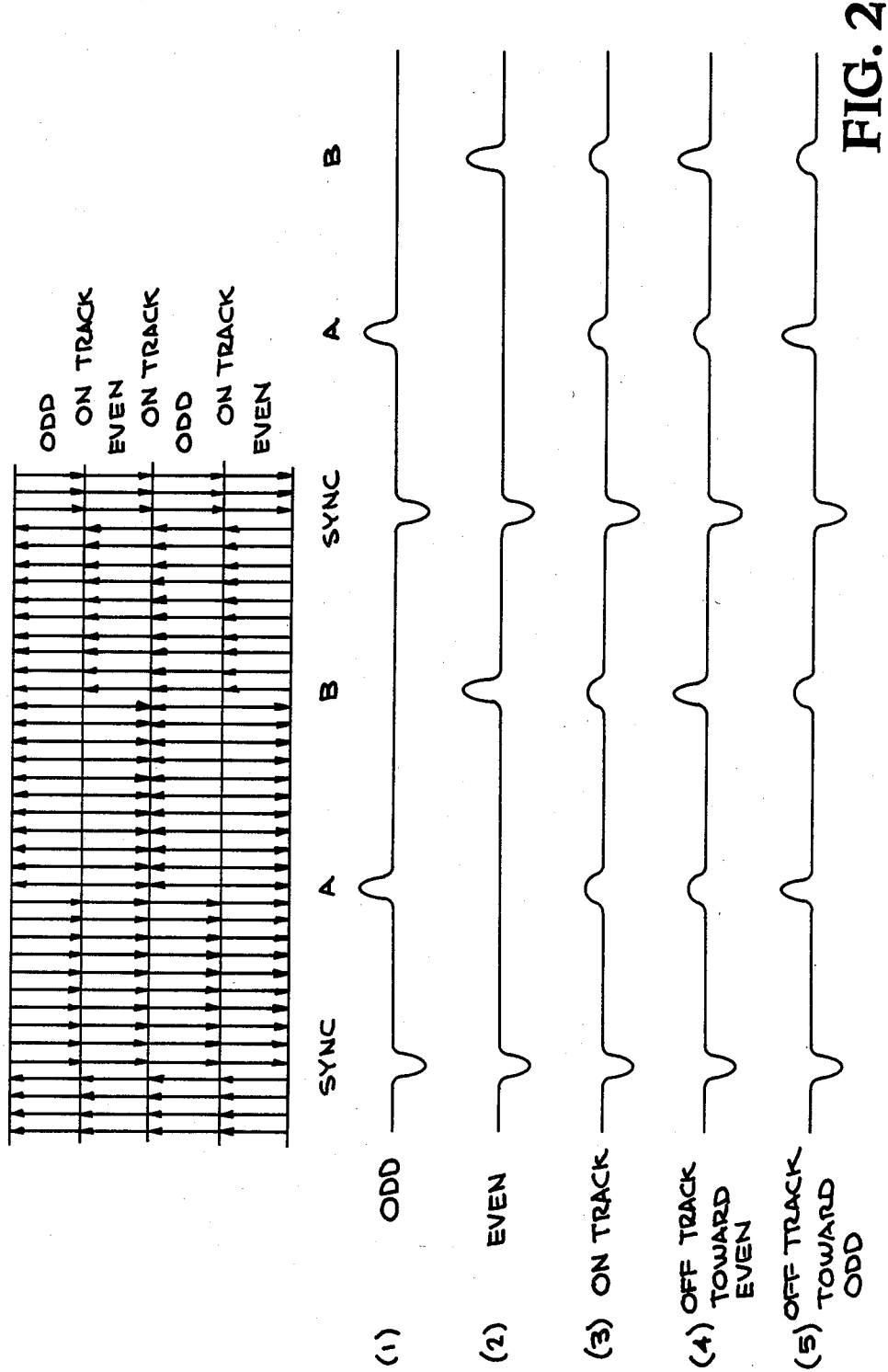
FIG. 2 is a drawing illustrating typical non quadrature data flux transitions on the servo data service and the resulting servo data for various servo data positions.

The operation of the amplitude demodulator 12 is described in more detail in U.S. patent application "Servo Data Demodulator", Ser. No. 794,943, filed 11/1/85 which has been incorporated by reference herein. For completeness a short summary of the operation of the amplitude decoder will be given here. The purpose of the amplitude decoder is to sample the amplitudes of whatever servo data pulses which occur in the timing windows generated by the timing window generator 18 and to create a position error signal or signals therefrom. The timing windows are defined by signals on the timing bus 30 which originates from the timing generator 32. A QUADSEL input signal on the input line 35 from the user tells the timing generator 32 whether 4 timing windows are needed for quadrature data or 2 timing windows are needed for tri-bit servo data. FIG. 2 shows a typical non quadrature servo data encoding scheme using one synchronization pulse of opposite polarity from the servo data pulses (tri-bit servo data encoding). This figure can be interpreted by those skilled in the art in the same manner as the quadrature data encoding figures in the U.S. patent applications incorporated herein by reference per the descriptions given in those documents, and no further details will be given here other than to say that the top portion of the drawing illustrates the actual flux changes recorded as servo data on the magnetic media, and the signals on time lines 1 through 5 represent the signal amplitudes which would result for 5 different head positions.

The timing window information is sent to a peak detector 34. The filtered servo data is input to the peak detector 34 on the FILIN input line. The timing windows enable the peak detector the specified number of times during each data frame depending upon the type of data being decoded. The peak detector then detects the maximum positive voltage that occurs during the gate period established by the timing window. This signal output is stored on the capacitor in the peak detector 34, and thus some droop will occur because of various discharging currents. This droop should be less than 1 millivolt so as not to lose minimum level signals until they are sampled by the sample and hold amplifier assigned to the particular window in which they occurred. The worst case time interval between the voltage peak at the peak detector and the sample time is 1 microsecond. FIG. 3 shows, on time lines 1 and 2, the sequence of voltages which would result during the A and B time windows at the output of the peak detector 34 for various head positions in non quadrature servo data demodulation. Time line 3 shows the resultant output PES1OUT from the servo data demodulator which would result from the demodulation of the peak detector outputs during the A and B sample windows shown on time lines 1 and 2. The manner in which this is done is as follows.

The output of the peak detector on the line 36 is sampled sequentially by the sample and hold circuits for windows A through D. The circuit used for these sample and hold circuits is described in detail in U.S. patent application "Fast Sample and Hold Circuit", Ser. No. 771,434, filed 30 Aug. 1985 and assigned to the assignee hereof. This patent application is hereby incorporated by reference. Any sample and hold which can meet the requirements stated elsewhere herein will suffice to practice the invention. The sequential enabling of the appropriate sample and hold for the appropriate window is done by signals on the timing bus 30. External capacitors may be coupled by the user to the pins CA, CB, CC and CD to extend the hold time of the sample and hold circuits 38, 40, 42 and 44.

After the sample is done by the peak detector 34, the voltage on the capacitor is discharged by a switch (not shown) controlled by a signal P. D. CLEAR (not shown) on the timing bus 30. This P. D. CLEAR signal is illustrated elsewhere herein on the PESG timing diagram. The peak detector 34 should be capable of clearing within 5 nanoseconds to a fixed reference voltage. The gain of the peak detector should be 1, and the capacitor charging time constant should be less than 10 nanoseconds. The capacitor discharging current should be less than 1 nanoampere, and the capacitor clearing current should be greater than 1 milliampere. A very high input impedance and a very low output impedance is desirable, so a voltage follower buffer between the peak detector and the following sample and hold stages is generally desirable. These parameters are only typical of the preferred embodiment however, and many other parameters could also be used to practice the invention.

The sample and hold circuits 38, 40, etc. need to be matched, with sampling times of about 15 nanoseconds for the frequencies and rotation speeds of most disk drive systems of interest. The sampled voltage may differ from the original peak voltage stored by the peak detector by up to approximately 10%, but all four sample and hold circuits should be matched to within plus or minus 0.1%. The maximum voltage to be detected is approximately 1 volt so the droop characteristic needs to be less than or no more than 1 millivolt. In such a case the discharge shape is unimportant. Sample and holds with droop parameters of more than 1 millivolt may be used, but they should have linear discharge shapes with equal slope for each sample and hold. The matching of these parameters is necessary so that A minus B and C minus D remains constant since these two numbers are equal to the value of the PES1 and PES2 position error signals in quadrature data. In tri-bit data, only PES1 is generated, and it is calculated as A minus B, i.e., the output of sample and hold circuit 38 minus the output of the sample and hold circuit 40.

The sample and hold circuits should have a sampling time of less than 15 nanoseconds in the preferred embodiment, although other parameters will work in other embodiments. The hold time should be approximately 10 microseconds or 1 millisecond if embedded servo data is being used. If external capacitors are used, the leakage should be less than 10 microamperes.

Figure 4:
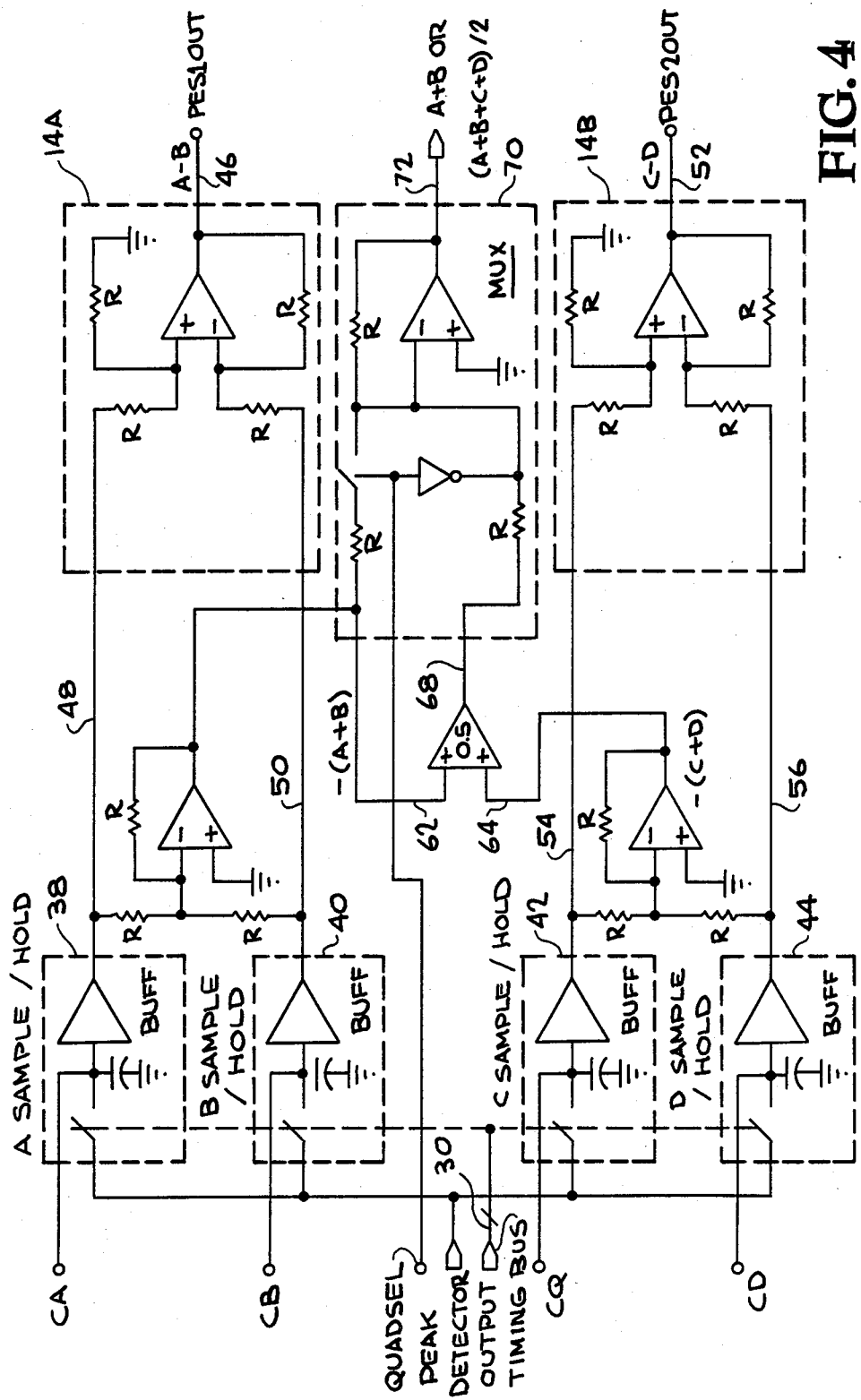
FIG. 4 is a diagram of the servo data demodulator and automatic gain control circuitry.

The output amplifier circuitry in the PESG which generates the position error signals and which generates the input signals for the AGC circuitry is illustrated in more detail in FIG. 4. The position error signal number 1 is designated PES1OUT and is generated on the line 46 by the difference amplifier 14A. This amplifier has its differential inputs 48 and 50 coupled to the outputs of the A and B window sample and hold circuits 38 and 40, respectively. The second position error signal PES2-OUT on line 52 is generated by the difference amplifier 14B which has its differential inputs 54 and 56 coupled to the outputs of the C and D window sample and hold circuits 42 and 44. The reason that these difference signals on the lines 46 and 52 represent the head position errors is explained in greater detail in the patent applications incorporated herein by reference and will be understood by those skilled in the art.

THE AUTOMATIC GAIN CONTROL CIRCUITRY

The automatic gain control circuitry 16 functions as follows. As the head moves off track center the peak amplitudes in the A and B windows and in the C and D windows change relative to each other. This change indicates the off track center position, but the sum of A+B and C+D should still be the same, and thus A+B+C+D should remain the same also. If it does not, then some other factor is affecting the signal levels in the system, and the gain of the input amplifier 24 should be changed to compensate for this fact. The first function of the AGC circuitry 16 is to derive the A+B and the C+D signals. These two signals are generated by the amplifiers 58 and 60, respectively which are illustrated in more detail in FIG. 4. These two summing amplifiers have their inputs, respectively coupled to the outputs 48 and 50 of the A and B sample and hold circuits and to the outputs 54 and 56 of the C and D sample and hold circuits respectively. The A+B signal on the line 62 and the C+D signal on the line 64 are coupled to the summing inputs of a summing amplifier 66. These two signals should each be approximately 2.5 volts, but this is not critical to the invention. The amplifier 66 has a output signal amplitude equal to (A+B+C+D)/2. The amplifiers should have a bandwidth of approximately 10 MHz and a gain of 1 with an offset voltage of 1 millivolt, but these parameters are not critical to the invention.

This amplifier outputs an (A+B+C+D)/2 signal on the line 68 which is coupled to one input of a multiplexer 70. Another input of the multiplexer 70 is the A+B signal alone on the line 62. The multiplexer should not have any offset voltage, and any offset voltage should be compensated. The QUADSEL signal on the line 34 is coupled to the select input of the multiplexer 70 and controls which of these two inputs is selected for coupling to the output 72. In quadrature data, the multiplexer couples the input signal on the line 68 to the output line. In tri-bit data, C−D or PES2OUT is not used, so the multiplexer 70 selects the input signal on the line 62 for coupling to the output 72.

The selected signal on the line 72 is coupled to the input of an AGC error signal generator 74. This signal compares the sum signal on the line 72 to a reference signal generated internally by the reference source circuit 76 and supplied to circuit 74 on a line 78. The AGC error signal in generated on the line 80 and is made accessible to the user on the AGCOUT signal pin. The AGCOUT error output signal is equal to the difference of the sum signal on the line 72 to the reference signal on the line 78. The reference voltage for AGC on the line 78 is also supplied to the user as the REFOUT signal so that the user may set the rest of his system to the AGC levels being used by the servo data decoder.

Normally the user couples the AGCOUT signal to the AGCIN input signal line coupled to the input amplifier 24. The error signal is zero when the servo data pulses sum to the reference value and non zero for any deviation. The user sets the resistor gain by the GAIN pin connections, line 26, so that the AGC stage gain is in the center value of the resistor established range for nominal situations. The zero value for AGCOUT should correspond to the center gain.

The AGCOUT to AGCIN signal path is broken to allow the user to put in a filter. The minimum response time for the AGC circuit in the preferred embodiment is 5 microseconds, but this is not critical to the invention. The filter response or time constant should be chosen by the user to suit his drive characteristics.

The gain should be controlled to within 0.1% accuracy in the preferred embodiment so as to not generate an artificial PES. The peak values that are used to generate the PES signals are equal to the product of the input peaks and the system gain. Gain errors will generate errors in the difference signals A−B and C−D. Thus the PES signals will cease to be linear functions of the input signals if gain errors are not controlled. To achieve 0.1% stability in the controlled signal, the AGC loop gain has to be greater than or equal to 1000. To allow for some attenuation in an external filter between AGCOUT and AGCIN, the AGC loop gain should be greater than 2000 in the preferred embodiment. Thus the gain adjustment accuracy after 5 microseconds should be 0.1% in the preferred embodiment.

The REFOUT signal from the reference source is also used as a reference level for a comparator 86 and a track crossing signal generator 88 in the PESP. The comparator 86 serves to signal a PES control signal generator 90 via a bus 92 the times when the various inverted and non inverted version of the signals PES-1IN and PES2IN exceed the reference voltage. This allows proper control signals to be generated to control a GPES multiplexer 94 to properly select the particular one of the PES1IN, PES2IN and their inverted counterparts on the bus 96 for use as the GPES signal. This switching must be done so that at all times the GPES signal has a positive slope since the head positioning servo control systems which will use the GPES signal to control head position to keep it on track do not function with negative slope error signals. The reference voltage level applied to the track crossing generator 88 is used by this logic to compare the signals on the bus 96 to the reference voltage to determine the time when a track is crossed. This time may then be signalled to the head positioning system for use in managing the velocity profile. The user may fine tune the timing of the generation of the GPES and TC signals by level shifting the reference voltage applied to the PESREF and the TCREF input signal lines.

The Phase Lock Loop Timing Signal Generator

The purpose of the phase lock loop timing signal generator 18 is to establish a clock frequency which is synchronized with the synchronization signals which are either recorded in the servo data or supplied by the user. This clock frequency is then used to generate timing windows and other control signals which are precisely positioned in time relative to the beginning of every servo data frame for use in controlling the sample and hold circuits and the peak detector 34. The first thing which must be done to accomplish this function is to separate out the sync pulses from the recorded servo data in embodiments where recorded sync pulses are used. This is done by use of both amplitude discrimination and time discrimination.

The Sync Separator

Figure 5:
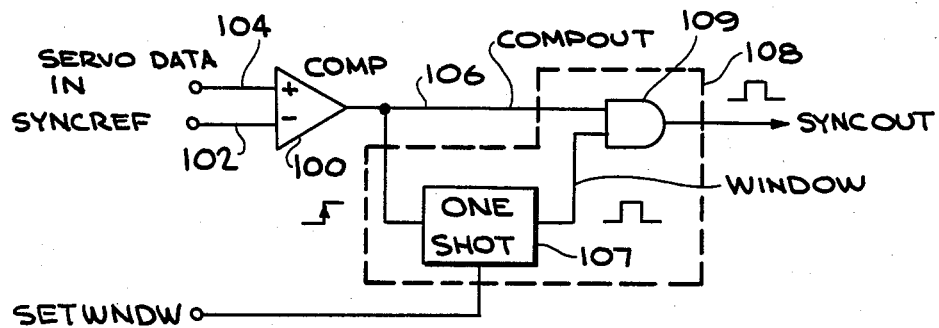
FIG. 5 is a functional diagram of the window generator.
Figure 6:
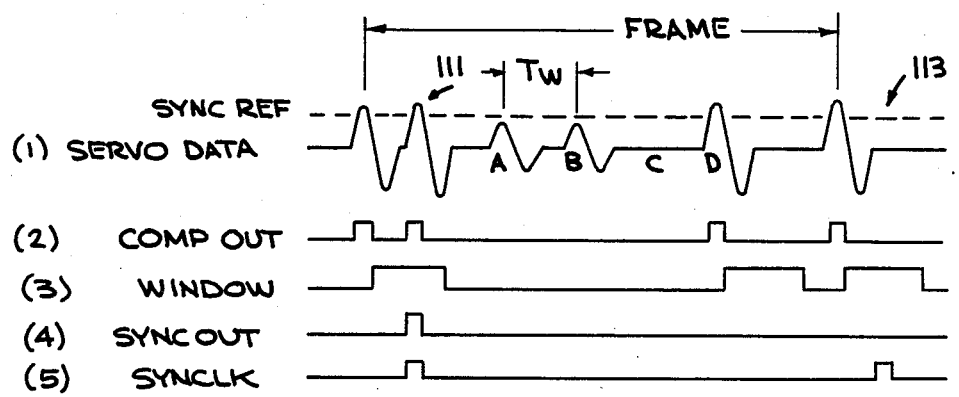
FIG. 6 is a timing diagram of typical timing for various signals which occur in gating of the SYNCOUT signal from the window generator for quadrature data.
Figure 7:
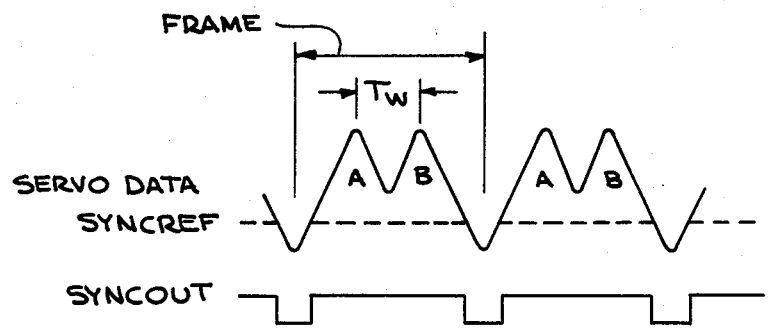
FIG. 7 is a timing diagram of the timing in generating the SYNCOUT signal for tri bit servo data.

The functional representation of the sync separator is shown in FIG. 5. The timing of the sync separator operation is as shown in FIG. 6 for quadrature data and as shown in FIG. 7 for tri-bit encoded servo data. The amplitude discrimination is provided by a synchronization comparator 100 which receives a SYNCREF input signal from the user at one input 102 and the buffered, amplified and filtered servo data from the head at the other input 104. The SYNCREF signal is a reference voltage set by the user. If the received peak is greater than the reference voltage, a positive going pulse will be generated at the comparator 100 output 106 during the interval that the signal on the line 104 is greater than the reference voltage on the line 102. Because the input data amplitude is constant on line 104 from the AGC operation, there is no need for the reference voltage to be adaptive.

The time discrimination is provided by the window generator 108. This circuit generates a time window around the time the synchronization pulse is expected to occur. The duration of this time window must be greater than the duration of the pair of sync pulses used in quadrature data, but it must be smaller than any other interval. The window time may be adjusted by the user by changing the magnitude of an external capacitor coupled to the SETWNDW pin. The range for the sync window is from 50 to 1000 nanoseconds, and the SYNCREF signal should be less than 2.5 volts in the preferred embodiment.

The window generator 108 is basically a one shot which looks at the first occurring sync pulse and then determines if another sync pulse occurs within a predetermined window following the first sync pulse. If a sync pulse does so appear, then it is considered to be a valid sync pulse. The capacitor picked by the user can program the duration of the window which follows the first sync pulse. Basically, any pulse which appears at the output of the sync comparator 100 during the window set by the window generator 108 will be passed through the window generator as the output signal SYNCOUT. For embodiments which use recorded sync pulses as the sync input to the phase locked loop 18, SYNCOUT is coupled back into SYNCIN as an input to the phase detector 110. A phase error signal is generated by phase detector 110 on the line 112 for the phase error between the input sync pulses of SYNCIN and the sync clock signal SYNCLK which is the output of the voltage controlled oscillator 114 divided by 32 in the timing generator 116.

In tri-bit data where only one sync pulse is used as shown in FIGS. 2 and 7 (or other schemes where only one sync pulse is used which is different in polarity or absolute value than data pulses), only the amplitude discrimination need be used for sync separation. Time window discrimination is disabled by connecting a resistor at SETWNDW to COM, the ground line for the analog circuitry.

For schemes where certain data such as digital servo information is encoded, typically in Gray code, by the presence or absence of a second sync pulse in successive servo data frames, the user may decode this information using the SYNCOUT and SYNCLK pins. This is illustrated in FIG. 6 by the presence of the second pulse at 111 and the absence of a second pulse at 113 on time line 1. The SYNCLK signal is illustrated on time line 5 and occurs every frame. The SYNCLK signal may be used by the user as a clock time to check for the presence or absence of the second sync pulse by clocking into a latch the status of the SYNCOUT signal on the time line 4 at every occurrence of the SYNCLK signal.

In FIG. 3, the comparator 100 changes states from logic 0 to logic 1 on the output line 106 each time the amplitude of the signal on the line 104 exceeds the SYNCREF reference level on the line 102. This triggers a one shot 107 in the window generator 108 to output a pulse of a duration set by the external components coupled to the SETWNDW pin by the user. This pulse enables an AND gate 109 to allow the signals on the line 106 to pass through to the SYNCOUT output line. Thus the changes of state on the line 106 as the second sync pulse passes through the SYNCREF reference levels creates a sync reference pulse as the SYNCOUT pulse at the time of occurrence of the second sync pulse.

The Phase Locked Loop

Some description of the purpose and operation of the phase locked loop (hereafter PLL) has been made above. Further, those skilled in the art understand the principals of operation of these devices. Basically, phase locked loops are clocks which can be synchronized to an external source of sync pulses. Only the details pertinent to our preferred embodiment will be provided here. The voltage controlled oscillator (hereafter VCO) 114 runs at 32 times the sync pulse frequency of the data frames. This high frequency is output on the line 118 which is coupled to both the VCOUT pin and the timing generator 116 where it is divided down in frequency to the frequency of the SYNCLK signal. This SYNCLK signal has the same frequency as the incoming sync pulses, and the phase detector 110 generates a phase error signal on the line 112 which is used to maintain the two signals in phase with each other. The error signal on the line 112 is coupled through a filter 120 to the control input of the VCO 114 which changes its frequency sufficiently to bring the phase difference between the SYNCIN signal and the SYNCLK signal to zero. The VCOUT signal may be used for system checking and/or as a write clock in the user's system.

The VCO has a user defined center frequency. This frequency can be set by a crystal or a capacitor or by another oscillator coupled to the SETFRQ pin.

The PLL has a first order active filter with a user defined pole-zero pair established by the user by components coupled to the PLLFILT pin. This filter sets the response bandwidth of the PLL so that it can track the relatively slow speed variations in disk speed without following high frequency jitter or noise. With this filter, the PLL becomes a second order loop. The components of the phase locked loop are well known in their structure, and need not be described here. Any PLL design which can be synchronized to a sync signal with occasional missing sync pulses will suffice to do the job. In some embodiments, there are missing sync pulses (usually the second in the pair for quadrature data) which are used to encode and uniquely identify index, guard bands, track 00 and so on. In order to allow this decoding, the PLL output signal SYNCLK is delayed or phase shifted by a constant 1/32 frame period. In this way, the positive edge of SYNCLK can be used as a timing indicator to test for existence of the second sync pulse. To cope with these user systems, the PLL must be designed such that the loop freezes the phase of the previous output and not measure the phase difference during these cycles where there is a missing sync pulse. This type of operation calls for a special kind of phase detector which is activated by the input signal whenever it appears, but is not otherwise active. Such phase detectors are known. The maximum number of consecutive frames with a missing sync pulse should be no more than 3.

In dedicated servo systems the reference sync signals are supplied continuously from the moment the power is turned on. After the loop acquires the first lock, it should stay locked. If the loop becomes unlocked because of any reason, its response time should be such that it can reacquire a lock in 6 servo data frames.

In embedded servo systems, the PLL must be able to reacquire lock on each new burst of servo data. These servo data bursts will contain at least 12 frames, and no missing sync pulses are customarily used. The timing generator will be disabled from generating its sample windows by the application of the HOLD signal by the user while the head is over read/write data. The VCO 114 will continue to oscillate however.

The preferred embodiment uses a PLL with a closed loop transfer function of order 2, and a VCO center frequency of from 3.2 to 64 MHz. The VCO maximum deviation is plus or minus 15% from center frequency and the lock in frequency range is plus or minus 10% of the center frequency. The hold in range is plus or minus 10% of the center frequency, and the phase offset error is less than 1 degree. These values are only typical and are not critical to the invention, as long as the embodiment selected can perform the function specified herein. The various other parameters and their relationships in terms of the transfer functions in the PLL are given in Appendix A.

The timing generator 116 is a series of counters and a divide by 32 frequency divider. The peak detector 34 and the A through D window sample and holds are controlled by timing signals on the timing bus 30 by the timing generator 116. These control signals are programmable by the signals on two groups of four pins: SELDEL and SETWTH. The binary number the user puts on the SETDEL pins establishes the time from the rising edge of the SYNCLK signal to the first control signal. The binary number the user puts on the SETWTH pins establishes the time between control signals. This time is generally set to equal the time between the input data pulses.

Figure 8:
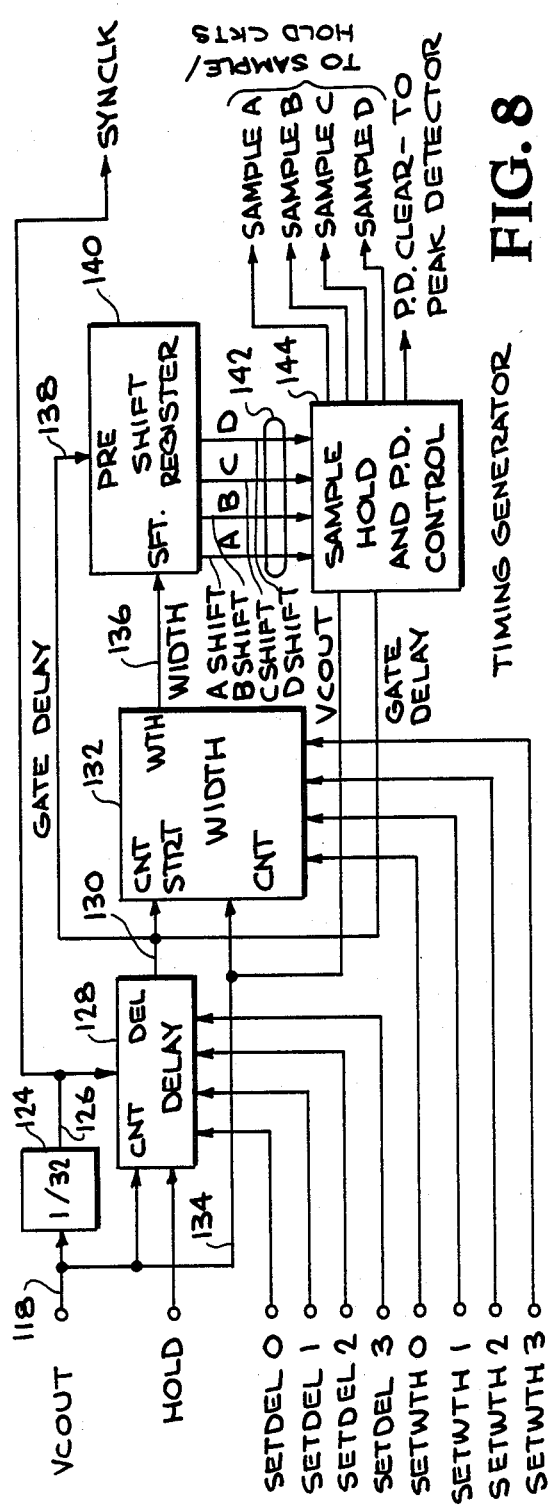
FIG. 8 is a logic diagram for the timing generator of the PESG.

The logic of the timing generator is shown in FIG. 8. The divide by 32 circuit 124 is well known in the art, and generates a square wave 32 VCO cycles long. Its output on line 126 goes to the phase detector as the SYNCLK signal, and also goes to a delay circuit 128. The delay circuit generates a pulse which occurs a user defined interval after the rising edge of SYNCLK. The length of the interval is determined by the number on the SETDEL 0 through 3 signal lines. The delay circuit 128 counts down by one for each VCO cycle on a line 134 from the count set by the user on the SETDEL lines, and when the count reaches zero, the GATE DELAY signal on line 138 goes high. When VCOUT goes low, the delay counter is reloaded with the number on the SETDEL 0 through 3 input lines set by the user.

A width circuit 132 is a counter which is started when the GATE DELAY signal on the line 130 is activated by the delay circuit 128. The circuit counts down from the value on the SETWTH 0 through 3 lines by one for every VCO cycle occurring on the line 134 until the count reaches zero. When this count is reached, the width circuit outputs a WIDTH pulse on the output line 136. This causes the width circuit 132 to reload the current value on the SETWTH input signal lines.

The details of the delay circuit 128 are given in U.S. patent application "Servo Data Demodulator", Ser. No. 794,943, filed 11/1/85 which has been incorporated by reference herein. No further details will be given here. The details of the width generator 132 are also given in the above cited patent application, and no further details will be given here.

The signal GATE DELAY on line 138 may be disabled by the user by assertion of the HOLD input signal to enable sampling in embedded servo systems. When HOLD is asserted, the effect on the timing generator occurs at the next GATE DELAY signal. Thus a rising edge on HOLD allows the current frame processing to finish. A falling edge on HOLD frees the timing generator to start when the next GATE DELAY signal occurs.

Figure 9:
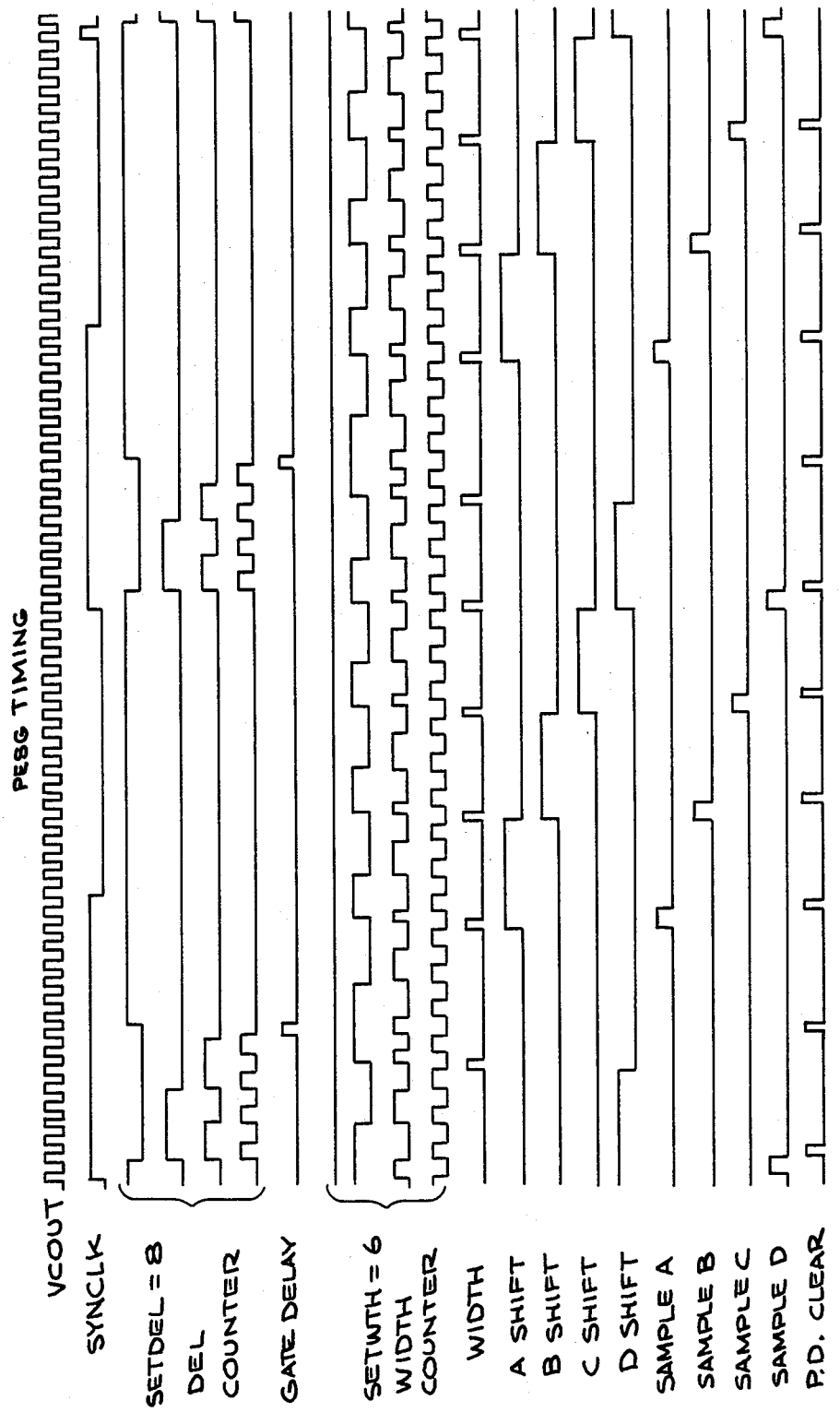
FIG. 9 is a timing diagram for the overall PESG timing.

FIG. 9 shows the overall timing of the operation of the PESG.

The Position Error Signal Processor

The PESP circuitry takes the PES1IN and the PES2IN signals and generates four signals which are suitable for connection to the rest of the servo system. The GPES signal is a position error signal that always has a positive slope for positive head movement. The VEL signal is a velocity signal which is equal to the slope of the appropriate position error signal input. It is used during seek operations by the servo system which controls the head movements. The linear indicator PES1LIN is a TTL output that indicates when PES1 is in a linear region. This signal is most useful when decoding tri-bit data, because the GPES signal in tri-bit data has a non linear region which is unusable by the servo system. The TC signal is a TTL track crossing indicator signal which indicates when the head is near a track center. It is used by the servo system to count track crossings, and to indicate when to switch to track following mode from seek mode.

By providing external pins for PES outputs and PES inputs, the user has the option of feeding the PES1OUT and PES2OUT signals directly into the PES1IN and PES2IN signal inputs or filtering the position error signals before coupling them into the PESP. In either case, the PES1IN and PES2IN signals are coupled to two lines 160 and 162 in the non inverted state. Two inverters 164 and 166 invert the PES1IN and PES2IN signals and couple them to two other lines 168 and 170. Together these four lines comprise a position error signal bus 172 which is coupled to the track crossing generator 88, the comparator 86 and the GPES multiplexer 94.

The position error signals on the bus 172 are compared by a bank of comparators in the comparator circuit 86 to the reference voltage level PESREF. The output of the comparators and the signals QUADSEL, DIR and SEEK are used by the PES control signal generator 90 to generate select control signals on a bus 174 coupled to the select control inputs of the GPES multiplexer 94 to control selection of the proper one of the position error signals on the bus 96 for output as the GPES signal. The GPES multiplexer is an analog multiplexer which selects the particular one of the position error signals such that GPES is equal to the linear, positive position slope portion of the appropriate position error input.

Unless the position error signals are filtered by the user, GPES will be updated every frame. If filtered by the user, GPES will be an average signal over several frames.

The comparator circuit 86 and a PESLIN generator 176 is shown in more detail in FIG. 10. The comparator 86 is comprised of a bank of comparators each of which compares a particular one of the position error signals on the bus 96 to the PESREF signal and generates one of the signals on the bus 92. The bus 92 signals indicate when particular ones of the position error signals exceed the reference level of PESREF which may be set by the user. The comparators should have an input hysteresis, of typically 30 millivolts, to eliminate output oscillation during state change.

The PES1LIN signal is generated by NOR gate 176 from the signals on bus 92 giving the status of position error signal 1 and its inverted counterpart. When PES1IN approaches its peak value in tri-bit data, it is no longer a linear function of position error. The system defines PES1IN as linear when the magnitude of PES1IN is less than PESREF.

The PES Control Signal Generator

The PES control signal generator 90 generates four internal gating signals from the signals on the bus 92 which control the multiplexer 94 to select the portion of the appropriate position error signal that has positive slope and to synchronize the GPES switch points, i.e., where the GPES multiplexer 94 switches from one position error signal to another, with the operations of the velocity generator 180. The circuit 90 also locks the multiplexer 94 control signals when the external system is in the track following mode.

Figure 11:
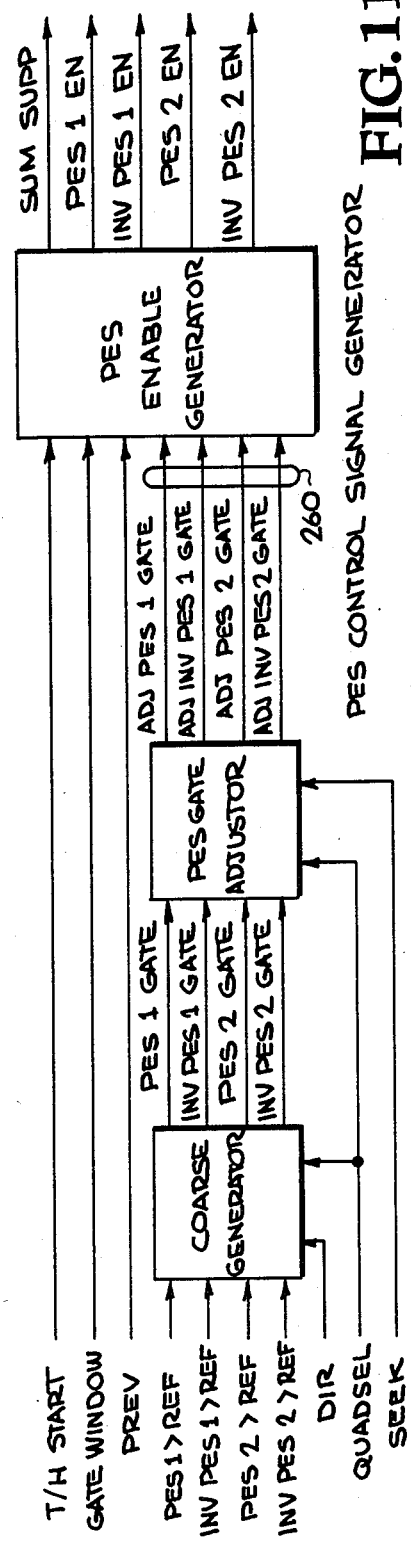
FIG. 11 is a logic diagram of the PES control signal generator.

The circuit 90 can be divided into three functional sections: the coarse generator, the adjustor and the PES enable generator. FIG. 11 shows the PES control signal generator functional blocks and the signals which couple each to the other. The coarse generator generates uncompensated gating signals. The adjustor compensates the gating signal for overlap and jitter. The enable generator synchronizes the gating signals to the next frame.

Figure 13:
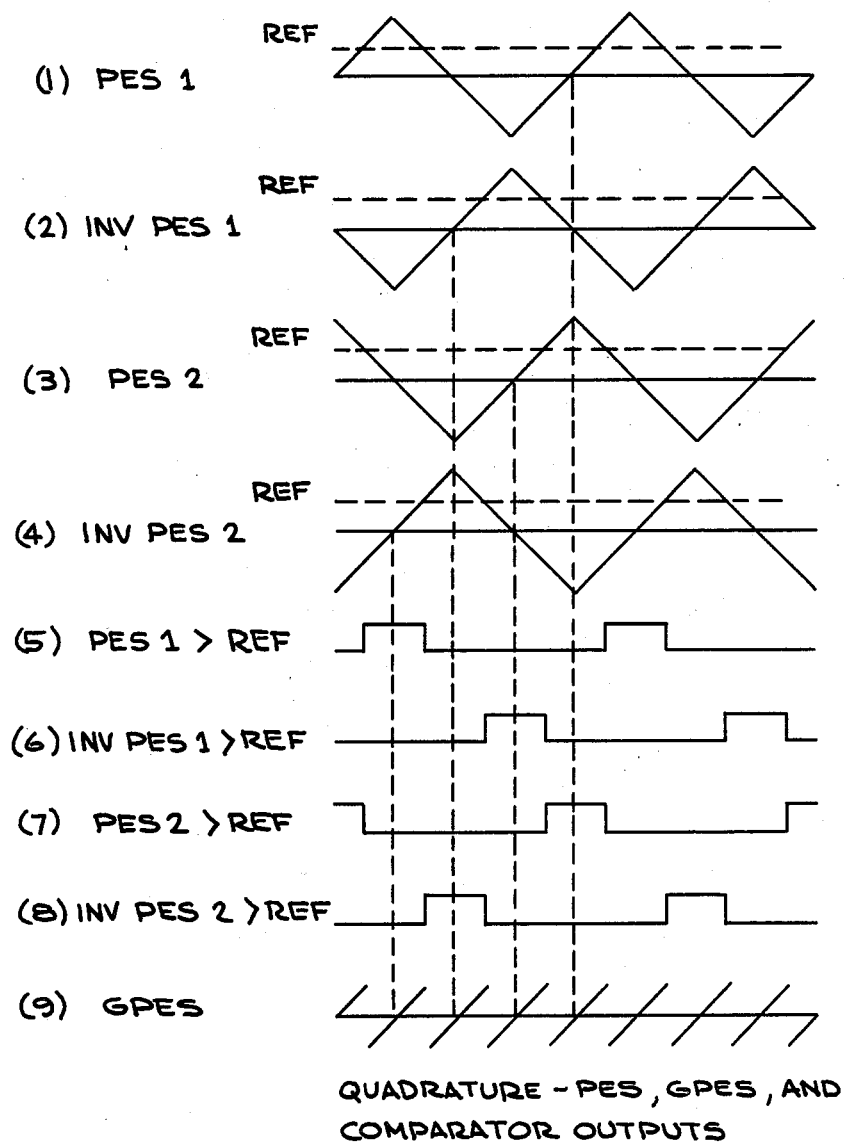
FIG. 13 is a diagram of the output signals for the comparator bank used in quadrature data situations to generate the PES and GPES signals.

Referring to FIG. 12 there is shown a diagram of the coarse generator. This circuit operates in two modes: quadrature and non quadrature. In the quadrature mode, there is a one to one correspondence between a specific comparator output being high, and a specific position error signal being in the positive slope region. This can best be seen from inspection of FIG. 13 which shows the states of the position error signals on the bus 96 and the signals on the bus 92 and the resultant GPES signal. The signals on lines 1 through 4 represent the signals on the bus 96, and the signals on lines 5 thrugh 8 represent the signals on the bus 92. Because of the relationship between these signals, the comparator outputs on bus 92 may be used as the PES gating signals to select the proper signal on the bus 96 as the GPES signal illustrated on line 9. The proper one of the signals on the bus 92 is selected for activation on the bus 174 by AND'ing the signals on bus 92 with QUADSEL in the AND gates 182 through 185.

Figure 14:
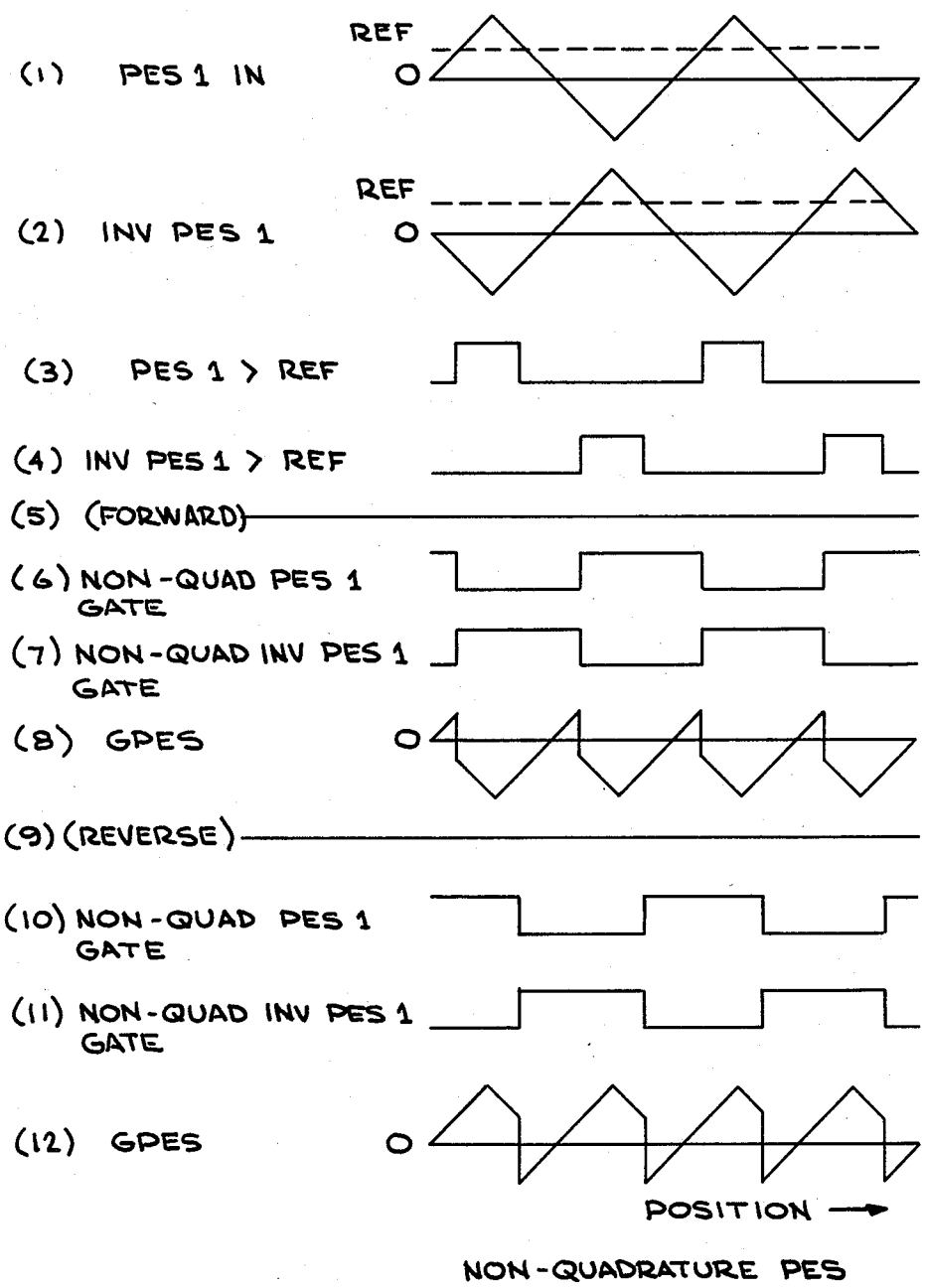
FIG. 14 is a diagram like FIG. 13 for non quadrature data PES and GPES generation.

The non quadrature position error signals do not contain sufficient information to generate the select signals to properly control the multiplexer 94. However, if the direction of head travel is known, the signals on the bus 174 may be properly generated to control the multiplexer 94 for non quadrature data. The DIR signal must be supplied by the user to indicate head travel direction in such a case. If the head is moving forward and the signal PES>REF is high, the next correct PES is INV PES1. This can be seen from inspection of FIG. 14 which shows the relationship between the signals on the bus 96 (lines 1 and 2), the signals on the bus 92 (lines 3 and 4), and the signals on the bus 174 (lines 5 and 6) and the resulting non quadrature GPES for forwad direction travel (line 7). The signals on the bus 174 and resulting GPES for non quadrature reverse travel are shown on lines 9 through 11. If the head is travelling in the reverse direction at the same position, the next correct position error signal is PES1IN. A similar situation exists for the situation where INV PES1>REF is high. The boolean expressions for activating the NON-QUAD PES1 GATE and NON-QUAD INV PES1 GATE signals is as follows:

(1) SET NON-QUAD PES1 GATE is true (line 194) if: (PES1>REF and DIR*) OR (INV PES1>REF AND DIR) where DIR* signifies DIR false; and (2) SET NON-QUAD INV PES1 GATE is true (line 196) if: (PES1>REF AND DIR) OR (INV PES1->REF AND DIR*).

Settng one non quadrature gating signal resets the other. The non quadrature PES control signal generator is shown at 190 in FIG. 12. An S-R latch 192 and a tree of AND and OR gates process the DIR signal and the signals on the bus 92 to generate the NON-QUAD PES1 GATE and the NON-QUAD INV PES1 GATE signals. SET NON-QUAD PES1 GATE is the set input line 194 of the latch 192, and SET NON-QUAD INV PES1 GATE is the reset input on line 196. When PES1 is in its non-linear region, either the set or reset input line 194 or 196, respectively, is high. The Q output line 198 will follow the signal on the line 194. When PES1 enters its linear region, both lines 194 and 196 are low from equations 1 and 2, and the Q output line 198 remains in its previous state until PES1 reenters its's non-linear region. The Q outut is NON-QUAD PES1 GATE, and its inverse is NON-QUAD INV PES1 GATE.

The non quadrature position error gating signals are selected by AND'ing them in gates 200 and 202 with QUADSEL* such that they are deselected in the quadrature mode. The non quadrature gate signals at the outputs of gates 200 and 202 are OR'ed in gates 204 and 206 with the signal QUAD PES1 GATE and the signal QUAD INV PES1 GATE to produce the signals PES1 GATE and INV PES1 GATE on the bus 174. The timing and operation of the coarse generator 190 in the non quadrature mode is illustrated in FIG. 15.

The output signals on the bus 174 of the coarse generator in FIG. 12 can overlap in the quadrature mode if the reference signal level PESREF is not set at exactly VPES PEAK VOLTAGE/2. This would result in two PES signals being enabled at the same time. Also, the comparators are susceptible to oscillation, which would cause velocity glitches at the GPES switch points.

The PES gate adjustor prevents these problems by causing the PES gating signals on the bus 174 to change states only at the leading edge of a PES gating signal. An embodiment for a PES gating signal adjustor is shown in FIG. 16. The timing of the operation of the circuit of FIG. 16 is shown in FIG. 17.

Any oscillation after the leading edge is ignored by virtue of the way in which the circuit of FIG. 16 works. If the gating signals overlap, as they do on time lines 1 through 4, the adjusted gating signals shown on time lines 5 through 8 change state before the high gating signal goes low. If the gating signals on the bus 174 do not overlap but have gaps between them as shown on time lines 9 through 12, then the adjusted gating signals wait for the next non adjusted gating signal (time lines 9 through 12) before changing state.

Locking of the gating signals during track following mode is accomplished by the gating signal adjustor by virtue of its coupling to the SEEK signal from the user. The AND gate 210 through 214 block the transmission of the unadjusted gate signals on the bus 174 to the circuitry 216 when SEEK is low. During the interval when SEEK is low, the adjusted gating signals are held at the states they last had when SEEK was last high. When SEEK goes to a high level, adjusting occurs.

The states of the adjusted gating signals on the bus 224 are defined by the rising edges of the input signals on the bus 174. To isolate the input data on the bus 174 the rest of the time, the Q and Q* outputs of the latches 218 and 220 are coupled to the trigger inputs of one shots 226 through 229. The outputs of these one shots are gated through to the set and reset inputs of flip flops 230 through 233. The AND gates 236 and 238 block passage of any data on the PES2 input lines when QUADSEL is low in non quad operations. The output of any one shot sets its corresponding S/R latch and resets all the rest through the action of the OR gates 240 through 243. The results in adjusted gating pulses which go true when its corresponding non adjusting gating signal on line 174 goes true and which goes false when any other gating signal on the bus 174 goes true. The one shot pulse durations should be matched to the requirements of a sufficiently long pulse to set the S/R latches, but should not exceed 20 nanoseconds in the preferred embodiment.

Placement of the blocking function of the SEEK signal at the output of the one shots reduces the possibility of control signal changes when SEEK goes high because the one outputs are usually low. However, this function could also be placed elsewhere.

Figure 18:
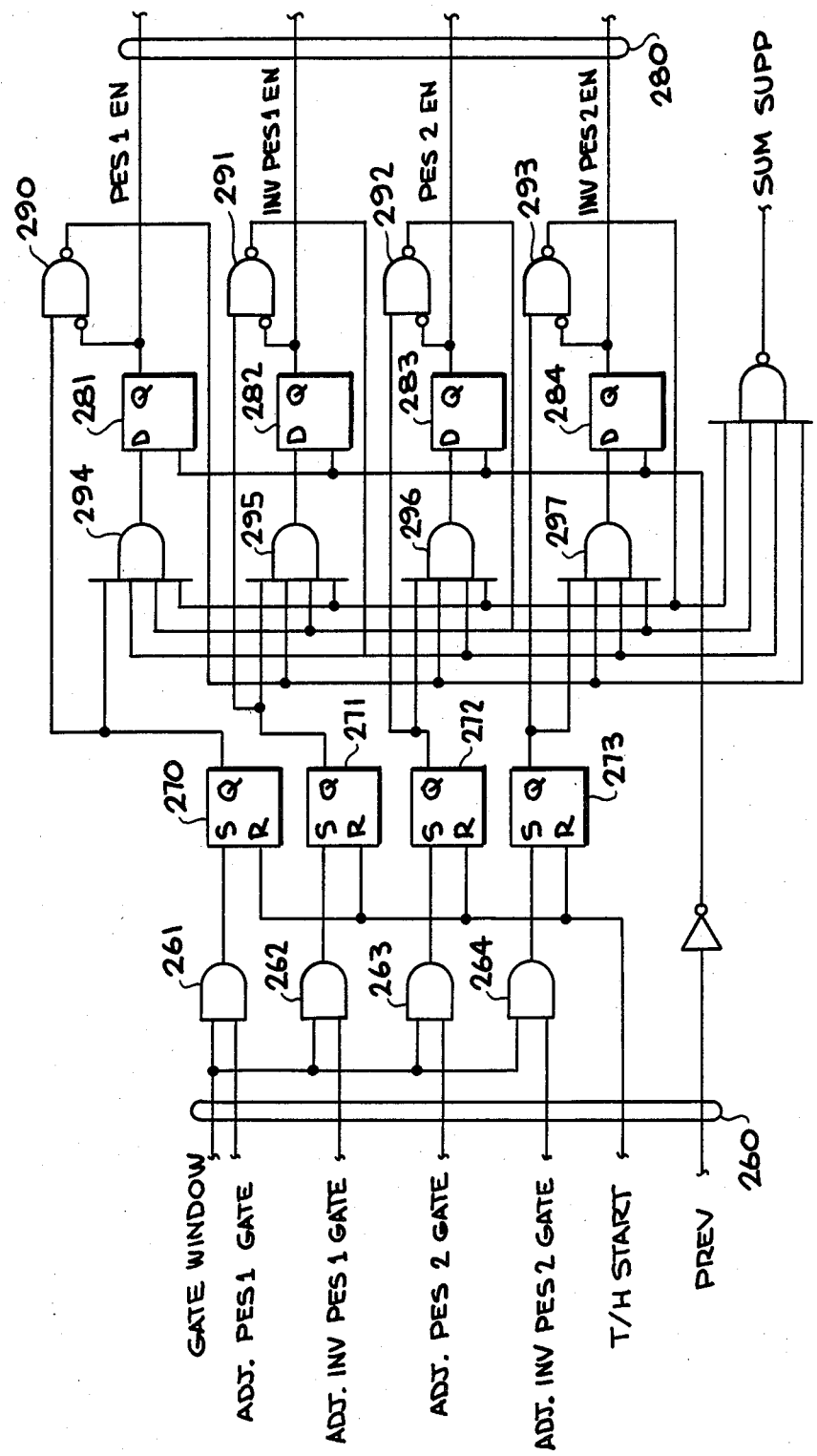
FIG. 18 is a PES enable generator.

FIG. 18 illustrates one embodiment for the PES enable generator. This circuit synchronizes the multiplexer 94 timing with the VEL timing. It delays switching by the multiplexer until the velocity generator sample and hold circuit has completed a cycle. This avoids discontinuities in the VEL signal. The inputs to this circuit are as shown on bus 260. The details of the velocity generator and the definition and operation of some of the input signals to the enable generator from the velocity generator are disclosed in U.S. patent application "Rate of Change Signal Generator Using Sampling Techniques", Ser. No. 856,730, filed 4/28/86 which is hereby incorporated by reference.

Figure 19:
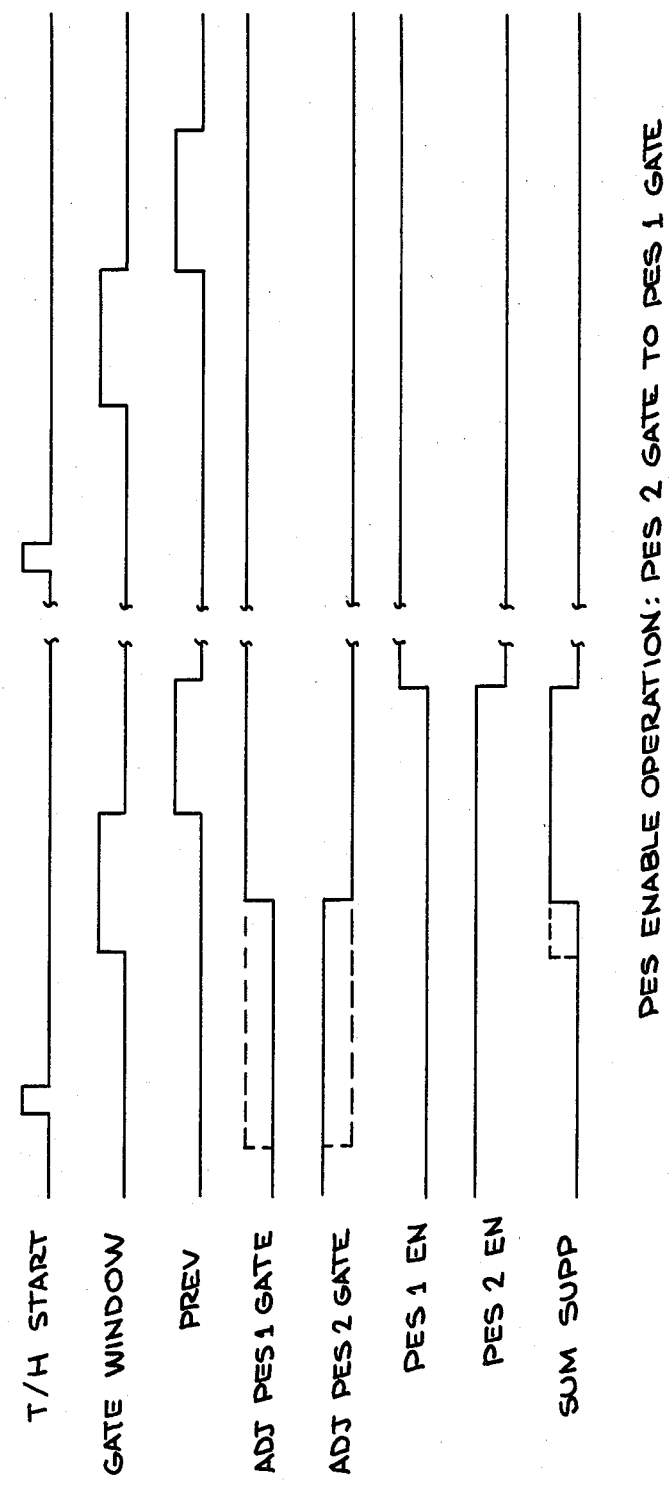
FIG. 19 is a timing diagram for the PES enable operation.

The timing of the operation of the PES enable generator is shown in FIG. 19. The T/H START signal resets the PES enable generator to wait for the GATE WINDOW signal from the velocity generator 180. When the GATE WINDOW signal goes high, the AND gates 261 through 264 allow the adjusted gating signals on the bus 260 to be latched into the latches 270 through 273. The enable output signals on the bus 280 coupled to the select inputs of the multiplexer 94 are the outputs of a group of D flip flops 281 through 284. The latches clock in the captured states of the adjusted gating signals on the trailing edge of the PREV signal from the velocity generator. If the adjusted gating signals changed states during the GATE WINDOW true interval, the enable output on the bus 280 corresponding to the adjusted gate signal on the bus 260 that went true is set to a true state. The enable output that corresponds to the adjusted gating signal that went low is set low.

The PES enable generator also generates the SUM SUPP signal which goes high at the trailing edge of GATE WINDOW when a captured adjusted gating signal is high and its corresponding enable signal is low. The SUM SUPP signal stays high until the next activation of the PREV signal.

In FIG. 18, the latches 270 through 273 are reset by the activation of T/H START at the beginning of each velocity cycle. When any enable signal is low on the bus 280, and the corresponding S/R latch 270 through 273 is set, the gates 290 through 297 combine to block the D inputs of all the other latches (281 through 284). This insures that only the enable signal on bus 280 corresponding to the adjusted gate signal on the bus 260 going high is high.

The GPES multiplexer 94 has four analog inputs on the bus 96 and receives the enable signals on the bus 280. The signals on the bus 280 cause the corresponding one of the signals on the bus 96 to be output as the GPES signal. For example, when PES1 GATE is high, GPES is equal to PES1IN.

When the servo system is in track following mode, GPES is a voltage proportional to the position error. In the quadrature mode, during seek operations, GPES is a sawtooth waveform which has a positive slope when the head is moving forward and a negative slope when the head is moving backward. In non quadrature operations, GPES switches to the next input before it's linear region. As a result, GPES resembles a capped saw tooth; however, the slope during the linear range of GPES is exactly the same as it is in the quadrature mode.

The details of the velocity generator 180 are given in the patent application cited above and incorporated herein by reference and will not be repeated here.

The Track Crossing Generator

The details of an embodiment for the track crossing generator are given in FIG. 20. This circuit generates a TTL compatible signal which indicates when the head is less than one quarter of a track from the track center. The circuit contains 4 comparators 300 through 303 which compare the position error signals on the bus 96 to the track crossing reference signal TCREF. The comparator outputs are AND'ed in gates 306 and 308 to generate signals TC1 and TC2. TC2 is enabled when QUADSEL is true. TC1 and TC2 are OR'ed by gate 310 to give the track crossing signal TC.

Appendix B gives the parameters for various elements in the PESP preferred embodiment. These parameters like others given herein are not critical to the invention provided the basic functional relationships described herein are maintained. Those skilled in the art will appreciate other circuits which may be substituted for the circuits given herein and that other parameters may work for other embodiments. Appendix C is a listing of the various signals involved in the quadrature and non quadrature modes and their state definitions.

APPENDIX A

Definitions and Expressions of PLL Terms $K_d$ = Phase detector gain = Output voltage/Input phase, V/rad.

$K_0$ = VCO gain = Deviation from center frequency/Input voltage, rad/sec/V.

The following expressions apply for any PLL connected as shown in FIG. 1.

Phase detector transfer function: $V_{out} = K_d(\phi_r - \phi_\phi)$ $\phi_r$ = Reference input phase.

$\phi_\phi$ = Feedback signal phase [VCO signal/N].

VCO transfer function: $\phi_\phi = K_\phi V_{in}/s$

Filter transfer function: $F(s) = V_{out}/V_{in}$

A second order loop contains a first order filter. For the general case, the filter has a pole/zero pair:

$$F(s) = (1+st_1)/(1+st_2)$$

Open loop transfer function: $LT(s) = K_\phi K_d F(s)/s$

Closed loop transfer function:

$$T(s): \phi_\phi/\phi_r = K_\phi K_d F[(s+K_\phi K_d F(s)]$$

In a second order loop, two useful parameters are defined:

The natural frequency, $w_n$.

The damping factor, $\$$.

The denominator of T(s) is brought to the standard form:

$$D(s) = s^2 + 2\$w_n s + w_n^2.$$

From equalizing the terms in the standard form with the actual denominator, $w_n$ and $\$$ are found as simple functions of $K_\phi$, $K_d$ and filter time constants. See F. M. Gardner's book "Phaselock Techniques" for examples.

The PLL characteristics are usually expressed as functions of $w_n$ and $\$$. Once a particular PLL configuration has been chosen, T(s) and all other parameters become functions of only $w_N$ and $\$$. By changing $K_\phi$, $K_d$, $t_1$, $t_2$ and observing how they influence PLL characteristics, the optimal set of these four design variables can be reached.

APPENDIX B

| | PROCESSOR CIRCUIT CHARACTERISTICS | | | | |
|---|---|---|---|---|---|
| characteristic | INV. AMP. | GPES COMP. TC COMP. | VEL T/H PREV & PRES | GPES MUX | VEL T/H SUM |
| GAIN | −1 | 10^8 | 1 | 1 | 1 to 100 |
| OFFSET | <1 mv. | <5 mv. | <5 mv. | <5 mv. | <5 mv. |
| HYSTERESIS | N/A | 30 mv. ± 10% | N/A | N/A | N/A |
| Zin | 100K | 100K | 100K | 100K | 100K |
| Zout | 10 | N/A | 10 | 10 | 10 |
| BW | 2 Mhz | N/A | 1 Mhz. | 1 Mhz. | 1 Mhz. |
| DELAY/SWITCH TIME | N/A | <200 nsec. | N/A | <50 nsec. | N/A |
| HOLD SHIFT | N/A | N/A | 10 mv | N/A | 10 mv. |
| DROOP | N/A | N/A | 1 mv/10 usec | N/A | 0.1 mv/usec |

| characteristic | PROCESSOR CIRCUIT CHARACTERISTICS | | | | |
|---|---|---|---|---|---|
| | INV. AMP. | GPES COMP. TC COMP. | VEL T/H PREV & PRES | GPES MUX | VEL T/H SUM |
| SAMPLING ACCURACY | N/A | N/A | 5% F.S. in 100 nsec. (.1% matched) | N/A | 0.1% F.S. in 100 nsec. |
| SLEW RATE | N/A | N/A | $\geq$ 5 v/100 ns | $\geq$ 5 v/100 ns | N/A |

APPENDIX C

Operational Modes

The encoder is designed to be used in two different types of servo systems: quadrature, and non-quadrature. The primary difference is that generator generates two position error signals in non-quadrature systems, and one in quadrature systems. As a result the decoder must adhere to two separate system requirements. One example is the direction signal (DIR). Non-quadrature systems must provide a direction signal to the processor. Quadrature systems have no such requirement. A complete list of system requirements is listed below.

Non-Quadrature:

QUADSEL—QUADSEL must be tied low.

SERVO DATA—The servo data is a serial input composed of two servo data pulses, and a sync pulse. The servo pulses are each on a single track, and written on alternating tracks.

AGC—AGCOUT is equal to AGCOUT=AGCIN—(Apeak+Bpeak)

PES—The PES outputs of the generator are PES-1OUT=Apeak−Bpeak; PES2OUT=0.

DIR—A TTL level direction (DIR) input is required. A high DIR indicates forward travel, and a low DIR indicates reverse travel.

GPES—GPES is a capped saw tooth. It's slope at the null point is positive during forward movement.

VEL—When the PES1 magnitude is greater than PES-REF, GPES is not a linear function of position error. The resulting velocity distortion is eliminated by giving VEL a track/hold characteristic. During the linear portion of PES1 it is in track, and during the non-linear portion it is in hold.

Quadrature:

QUADSEL—QUADSEL must be tied high.

SERVO DATA—The servo data is composed of four data pulses, each written on a single track, in a series of four tracks.

AGC—AGCOUT equals AGCREF—(Apeak+Bpeak+Cpeak+Dpeak)/2

PES—The PES outputs are PES1OUT=Apeak−Bpeak; PES2OUT=Cpeak−Dpeak.

DIR—In a quadrature system direction information can be derived from the servo data; therefore, a DIR input is not needed.

GPES—GPES is a saw tooth. It's ramp has a positive slope when the head is traveling forward.

VEL—In a quadrature mode servo system GPES is always a linear function of position error. Therefore, VEL is always in track.

What is claimed is:

1. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data.

2. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data; and further comprising:

means for allowing the user to synchronize the frequency of said phase locked loop with a signal supplied by the user and not embedded in said servo data.

3. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data; and further comprising:

means in said means for creating timing windows to allow a user to set the delay between the synchronization pulse and the occurrence of the first timing window.

4. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data;

means in said means for creating timing windows to allow a user to set the delay between the synchronization pulse and the occurrence of the first timing window; and further comprising means in said means for creating timing windows for allowing the user to set the duration of each timing window.

5. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data; and further comprising:

means in said means for creating one or more timing windows for allowing the user to cause said window generation to stop during periods when no valid servo data exists.

6. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom;

wherein said means for creating timing windows includes a phase locked loop and means for synchronizing the frequency of said phase locked loop which defines the times of occurrence of said timing windows with the occurrence of synchronizing pulses encoded in said servo data; and further comprising:

means coupled to said phase locked loop for allowing the user to alter the frequency response characteristics of said phase locked loop.

7. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom; and an input amplifier in said means for generating which amplifies the servo data arriving from the servo head, and means for allowing the user to control the gain of said input amplifier by supplying two signals a first of which controls the range of gain the amplifier is operating in and the second of which controls the actual gain within the range set by said first signal;

means coupled to said input amplifier for allowing the user to filter the output of the input amplifier to remove noise picked up in circuitry coupled to the input of said input amplifier and noise generated in the amplifier; and further comprising:

means coupled to said input amplifier for allowing the user to have access to the amplified servo data.

8. A decoder for servo data encoded with any amplitude dependent servo data encoding scheme comprising:

means for creating one or more timing windows synchronized to appear at the same predetermined times in every frame of servo data and to sample the amplitudes of one or more servo data pulses which occur during said timing windows and to generate one or more position error signals from the amplitudes so sampled; and means for processing said position error signals or signals to generate a gated position error signal having predetermined characteristics and a velocity and a track crossing signal therefrom; and further comprising:

means coupled to said means for processing said position error signals and to said means for creating one or more timing windows for allowing a user to apply a signal indicating whether the servo data to be decoded is quadrature or nonquadrature data and for causing the appropriate changes in processing by said means for creating and said means for processing.

9. A decoder for servo data encoded with any amplitude dependent servo data encoding scheme comprising:
  means for creating one or more timing windows synchronized to appear at the same predetermined times in every frame of servo data and to sample the amplitudes of one or more servo data pulses which occur during said timing windows and to generate one or more position error signals from the amplitudes so sampled; and
  means for processing said position error signals or signals to generate a gated position error signal having predetermined characteristics and a velocity and a track crossing signal therefrom;
  wherein said means for creating timing windows includes a phase locked loop and means for synchronizing the frequency of said phase locked loop which defines the times of occurrence of said timing windows with the occurrence of synchronizing pulses encoded in said servo data; and further comprising:
  means coupled to said phase locked loop for outputting a signal each time a synchronization signal from the recorded servo data is to appear and means coupled to said means for creating timing windows for providing access to the user to the synchronization pulse read from the servo data input such that the user can determine for each data frame in the servo data whether or not a synchronization pulse occurred for that servo data frame.

10. A decoder for servo data encoded with any amplitude dependent servo data encoding scheme comprising:
  means for creating one or more timing windows synchronized to appear at the same predetermined times in every frame of servo data and to sample the amplitudes of one or more servo data pulses which occur during said timing windows and to generate one or more position error signals from the amplitudes so sampled; and
  means for processing said position error signals or signals to generate a gated position error signal having predetermined characteristics and a velocity and a track crossing signal therefrom;
  means for processing said position error signals or signals to generate a gated position error signal having predetermined characteristics and a velocity and a track crossing signal therefrom;
  wherein said means for creating timing windows includes a phase locked loop and means for synchronizing the frequency of said phase locked loop which defines the times of occurrence of said timing windows with the occurrence of synchronizing pulses encoded in said servo data; and further comprising:
  means coupled to said means for creating one or more timing windows for supplying to the user the high speed clock signal of the voltage controlled oscillator of said phase locked loop so that the user may use it for a write clock or for any other purpose.

11. A decoder for servo data encoded with any amplitude dependent servo data encoding scheme comprising:
  means for creating one or more timing windows synchronized to appear at the same predetermined times in every frame of servo data and to sample the amplitudes of one or more servo data pulses which occur during said timing windows and to generate one or more position error signals from the amplitudes so sampled; and
  means for processing said position error signals or signals to generate a gated position error signal having predetermined characteristics and a velocity and a track crossing signal therefrom;
  wherein said means for creating timing windows includes a phase locked loop and means for synchronizing the frequency of said phase locked loop which defines the times of occurrence of said timing windows with the occurrence of synchronizing pulses encoded in said servo data; and further comprising: means in said means for creating one or more timing windows for allowing said phase locked loop to be synchronized to either single or double pulse synchronization signals.

12. A servo data decoder for decoding servo data recorded on a media and for generating control signals to control a head positioning servo system comprised of:
  means for receiving servo data in any amplitude dependent servo encoding format and detecting peak amplitudes of pulses therein;
  a phase locked loop for generating a local clock signal;
  means coupled to receive said servo data and to process it to allow either recorded synchronizing pulses in said data to be separated from said data or a user defined input signal to be used to synchronize said phase locked loop;
  timing generator means to generate sample window timing signals from said local clock signal for use in sampling the output of said means for receiving and for allowing the user to define the delay between the synchronization pulse and the first sample window and the width of each sample window;
  sample means for sampling the peak amplitude stored by said means for receiving at each of a plurality of times and for generating at least one position error signal from said samples;
  means for receiving said position error signals and for generating a velocity signal to indicate head velocity, a gated position error signal to indicate head position error and a track crossing signal to indicate when the head is within a predetermined distance of a track center.

13. An apparatus for generating a gated position error signal, a velocity signal and a track crossing signal for a magnetic head passing over servo data recorded in frames of either the tri-bit or quadrature format on the magnetic surface of a magnetic media having data tracks comprising:
  means for detecting the peak amplitudes of analog pulses derived from said servo data;
  means for sampling and holding the amplitudes of said analog pulses and for generating a plurality of outputs indicating said amplitudes;
  means for subtracting the outputs of said means for sampling and holding to generate at least one position error signal;
  position error calculating means for receiving a first signal indicating whether tri-bit or quadrature servo data is recorded on said magnetic media and for receiving said position error signal and for receiving a reference voltage and a second control signal indicating whether the magnetic head is in a track following mode or a seek mode and for receiving a third control signal indicating the direction of travel of said magnetic head in nonquadrature format servo data, said position error calculating means for generating a gated position error signal for indicating the degree that said magnetic head is located away from a track centerline for a data track in the track following mode;

velocity calculating means coupled to said position error calculating means and to said meanss for sampling and holding and coupled to receive said first signal, said velocity calculating means for generating a velocity signal; and track crossing calculation means coupled to receive said first signal and said position error signal for generating said track crossing signal.

* * * * *